US011748587B2

(12) United States Patent
Azuelos et al.

(10) Patent No.: US 11,748,587 B2
(45) Date of Patent: Sep. 5, 2023

(54) READING A GRAPHIC CODE

(71) Applicant: IDEMIA FRANCE, Courbevoie (FR)

(72) Inventors: Paul Azuelos, Courbevoie (FR); Matéo Lostanlen, Courbevoie (FR)

(*) Notice: Subject to any disclaimer, the term of this patent is extended or adjusted under 35 U.S.C. 154(b) by 0 days.

(21) Appl. No.: 17/382,535

(22) Filed: Jul. 22, 2021

(65) Prior Publication Data

US 2022/0027593 A1 Jan. 27, 2022

(30) Foreign Application Priority Data

Jul. 27, 2020 (FR) .................................... 20 07919

(51) Int. Cl.
*G06K 7/14* (2006.01)
*G06K 19/06* (2006.01)

(52) U.S. Cl.
CPC .......... *G06K 7/1417* (2013.01); *G06K 7/146* (2013.01)

(58) Field of Classification Search
CPC ... G06K 7/1417; G06K 7/146; G06K 19/0604
USPC .................................................. 235/462.1
See application file for complete search history.

(56) References Cited

U.S. PATENT DOCUMENTS

| 9,454,688 B1 | 9/2016 | Fang |
| 11,192,100 B2* | 12/2021 | McCord ............... G01J 3/0286 |
| 2013/0343645 A1* | 12/2013 | Dalal .................. G06K 7/1408 |
| | | 382/162 |

FOREIGN PATENT DOCUMENTS

| EP | 1807796 | 7/2007 |
| EP | 1870858 A2 | 12/2007 |

OTHER PUBLICATIONS

Keng Tan et al: "Designing a color Barcode for Mobile Applications", IEEE Pervasive Computing, IEEE Service Center, Los Alamitos, CA, US vol. 11, No. 2, Feb. 1, 2021 (Jan. 2, 2021), pp. 50-55, XP011442375, ISSN: 1536-1268, DOI: 10.1109/MPRV.2010.67.

* cited by examiner

*Primary Examiner* — Toan C Ly
(74) *Attorney, Agent, or Firm* — Jonathan Bingham

(57) ABSTRACT

The invention aims at reading, by a reading device, a 2D graphic code comprising zones including data zones encoding information based on real colours in a colour base and calibration zones presenting a predefined reference colour, the method comprising: optical acquisition of the 2D graphic code in current acquisition conditions to obtain image data, measuring of the observable colour in the calibration zones, spatial interpolation based on the observable colours in the calibration zones to estimate the theoretically observable colour for each base colour in the 2D graphic code, and classification based on the spatial interpolation for determining the real colour of analyzed data zones.

18 Claims, 9 Drawing Sheets

[Fig.7A-7B]

[Fig.8A-8B]
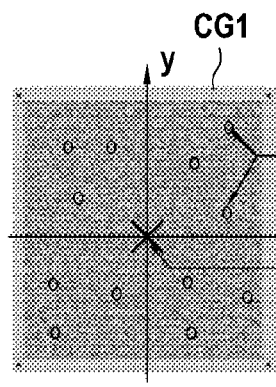
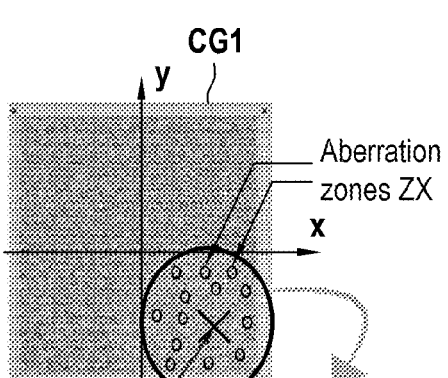
FIG.8A  FIG.8B
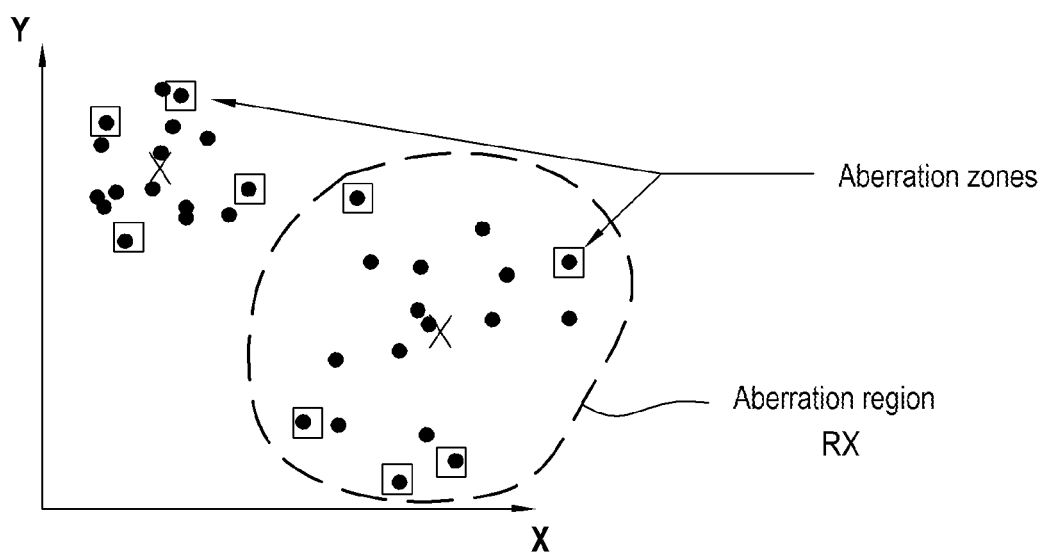
FIG.9

READING A GRAPHIC CODE

TECHNICAL FIELD

The invention relates to the field of graphic codes and more particularly relates to a graphic code capable of containing a high density of information.

BACKGROUND

As is known, (unidimensional) barcodes are graphic codes in the form of a series of bars and spaces the respective thickness of which varies as a function of the data which are coded. A barcode is formed on a medium, generally by a printing process, and codes information relatively compactly.

Barcodes are intended to be read by a barcode reader fitted with an optical sensor. The data coded in a barcode can therefore be acquired automatically by means of a barcode reader.

More recently, a novel type of barcode—called two-dimensional barcode or 2D barcode (barcode having 2 dimensions)—has been developed. A two-dimensional barcode is a graphic code or pictogram, constituted by small squares and white zones. This is a format in two dimensions of the unidimensional barcode, enabling greater concentration of information in a given space. As for a unidimensional barcode, the content of a 2D barcode, sometimes also called QR Code (for "Quick Response Code"), can be quickly read by means of a suitable barcode reader.

In general, barcodes and other equivalent pictograms are 2D graphic codes (more simply called "graphic codes"), that is, graphic codes formed on a two-dimensional medium and configured to code or represent a more or less substantial quantity of information.

Barcodes are used widely today, for example to identify items in shops worldwide. 2D barcodes (QR codes) are also undergoing growing use in recent times, for example for identifying a web page or an application, or even for coding a travel ticket or a ticket giving access to a given service. The 2D barcode is advantageous in that it can be recognized automatically by an application run on a terminal (portable telephone of "smartphone", tablet, webcam type) fitted with a camera.

A problem arises however during the reading of 2D graphic codes, especially when the latter exhibit a relatively large density of symbols. The capacity of a reading device to read a 2D graphic code and the quality of this reading are generally a function of the acquisition conditions in which the reading is performed. These conditions result in particular from the characteristics of the reading device used (hardware and software configuration) as well as lighting conditions or exposure to light of the 2D graphic code in question. Therefore, the reading of the same 2D graphic code can lead to results which vary considerably according to the configuration of the reading device or according to the lighting conditions in which the reading is performed. According to lighting conditions (orientation of the code, the light relative to the 2D graphic code, light intensity, characteristics of the medium on which the code features, etc.), the same reading device could produce variable reading results for the same 2D graphic code.

There is therefore a need for a solution allowing more reliable and more precise reading of 2D graphic codes such as QR codes, for example.

At the same time, there is a need to always store more information in such graphic codes. In some situations, a traditional graphic code does not offer sufficient storage capacity for coding all necessary information. Conventional graphic codes have technical restrictions which considerably limit the quantity of information that can be stored there. In particular, traditional graphic codes generally present in black and white only.

Increasing the density of a black and white 2D graphic code enables an increase in the quantity of information stored, though this density is limited by the capacity of reading devices to read the 2D graphic codes in question. The issues of reliability and reading precision mentioned hereinabove play a major role in these intrinsic limitations in terms of density of information which can be stored in a 2D graphic code nowadays.

It has already been possible to produce 2D colour graphic codes comprising symbols of different colours. In principle, the use of colour would heighten the density of information which can be stored, but in practice the applicant has noticed that it is very difficult to achieve reliable and precise reading of colour 2D graphic codes. Due to the problems of acquisition mentioned hereinabove, colours acquired in reading tend to vary substantially from one acquisition to another. The colours detected depend especially on the cameras being used (the type of sensors, etc.), the processing algorithms being used (post-processing), the lighting conditions, and all other parameters collectively making up the acquisition conditions. It is therefore difficult to obtain uniform acquisition results from one reading device to another in standard lighting conditions, as well as for the same reading device making several acquisitions under different lighting conditions.

This problem of lack of reliability and uniformity in the reading of a colour 2D graphic code is amplified even more by the fact that the processing algorithms implemented in some telephones (smartphones) and photo devices especially are today configured to improve (or at least adapt) the overall tone of the photographs taken so as to obtain a visual result complying with the expectations of users, the consequence of which will be to distort the colours of these graphic codes.

There is therefore a need for a solution for reliably and precisely reading a 2D graphic code, whether it is colour or black and white and irrespective of the acquisition conditions in which the reading is performed. In addition, there is a need for a solution for reading graphic codes presenting a high density of information, in particular of 2D colour graphic codes.

SUMMARY

For this purpose, the present invention relates to a method carried out by a reading device for reading a 2D graphic code comprising a plurality of zones each presenting a real colour which is attributed to it in a base of N distinct colours, N being an integer such that $N \geq 2$, said zones comprising:
  data zones encoding information based on real colours of said data zones; and
  at least 2N calibration zones at predefined positions in the 2D graphic code, the real colour of each calibration zone being a predefined reference colour in said colour base, the 2D graphic code comprising at least 2 calibration zones for each colour of the colour base, the method comprising the following steps:
  optical acquisition of the 2D graphic code in current acquisition conditions to obtain image data;

measuring, based on image data, of the observable colour in the calibration zones in the current acquisition conditions;

spatial interpolation, based on observable colours measured in the calibration zones and predefined positions of said calibration zones, to produce an estimation of the theoretically observable colour in the current acquisition conditions for each colour of the colour base in the data zones as a function of the position of said data zones; and classification based on the result of the spatial interpolation for determining the real colour attributed to at least one analyzed data zone, comprising for each analyzed data zone:

comparing the observable colour measured in said analyzed data zone with the theoretically observable colour estimated for each colour of the colour base at the position of said analyzed data zone; and determining, as real colour of said analyzed data zone, the colour of the colour base of which the theoretically observable colour estimated at the position of said analyzed data zone is the closest to the observable colour measured in said analyzed data zone.

Spatial interpolation produces an estimation of the theoretically observable colour in the current acquisition conditions for each colour of the colour base on the surface of the 2D graphic code, and in particular in the data zones as a function of the position of said data zones.

The present invention reliably and precisely reads a 2D graphic code, whether in colour or in black and white, and irrespective of the acquisition conditions in which the reading is performed. Because of the spatial interpolation performed based on the observable colours measured in the calibration zones, it is possible to obtain reliable and uniform reading results for a same 2D graphic code despite the differences in hardware and/or software configuration which can exist between different reading devices used (especially in the region of the imaging device and of the processing algorithm). The uniform and repetitive character of the reading results is also assured under variable lighting conditions from one reading operation to another. Reliable and precise reading can also be performed even under complex lighting conditions during a reading operation (for example when the lighting to which the 2D graphic code is exposed is not uniform).

It has been noted in particular that diverse lighting (for example causing over-exposed zones and/or under-exposed zones in terms of light) significantly heightens the risks of errors during the reading of a 2D graphic code. The invention eliminates this problem by making the reading results independent of the lighting used.

The invention also reads information stored in colour graphic codes (including graphic codes with multiple grey levels), by limiting the errors likely to occur especially due to the resemblance of the base colours used (for example when a large number of base colours is used) or again when the lighting is not uniform. It is therefore possible to store a larger quantity of information in a given surface.

In particular, it has been noted that colour graphic codes are difficult to read due to the strong influence of the lighting conditions and the (hardware and software) configuration of the reading device used on the colours read in these graphic codes. The invention eliminates these problems.

In addition, the invention saves the information stored in the 2D graphic code of the invention. Without knowing the position of the calibration zones and the data zones in a 2D graphic code of the invention in advance, it is difficult for a dishonest third party to read the information stored in this graphic code.

According to a particular embodiment, the method further comprises the determination of information encoded in the 2D graphic code based on the real colour determined during said classification as being attributed to each analyzed data zone.

According to a particular embodiment, the method further comprises detection of the calibration zones in the 2D graphic code based on the image data and based on previously recorded position data which comprise the predefined positions of each calibration zone in the 2D graphic code.

According to a particular embodiment, the method comprises consulting calibration data comprising the position data for each calibration zone in association with the respective reference colour attributed to said calibration zone, with detection of the calibration zones and spatial interpolation being performed based on the calibration data.

According to a particular embodiment, during spatial interpolation an estimation of the theoretically observable colour in the current acquisition conditions for each colour of the colour base is produced in the position of each data zone of the 2D graphic code.

According to a particular embodiment, spatial interpolation is performed so as to attribute, for at least one data zone, different weights to the observable colours measured in the calibration zones as a function of the distance separating said calibration zones from said data zone.

According to a particular embodiment, during spatial interpolation the estimation of the theoretically observable colour for each colour of the colour base is adapted in each data zone such that a greater weight is attributed to an observable colour measured in a first calibration zone presenting a reference colour in the colour base relative to an observable colour measured in at least one other second calibration zone presenting said reference colour if said first calibration zone is closer to said data zone than said at least one second calibration zone.

According to a particular embodiment, said comparison comprises determination of a deviation in respective colour between the observable colour measured in said analyzed data zone and the theoretically observable colour estimated for each colour of the colour base at the position of said analyzed data zone, in which said real colour determined as colour attributed to said analyzed data zone is the colour of the colour base for which said deviation is the lowest.

According to a particular embodiment, the calibration zones are distributed uniformly over the entire surface of the 2D graphic code.

According to a particular embodiment, the calibration zones are distributed randomly over the surface of the 2D graphic code.

According to a particular embodiment, during classification each data zone is analyzed to determine its real attributed colour in the colour base.

According to a particular embodiment, the method further comprises:

detection of aberration zones in the 2D graphic code;

calculation of the average position and of the variance in position of the aberration zones in the 2D graphic code; and location of an aberration region in the 2D graphic code based on the average position and of the variance in position;

in which the spatial interpolation comprises:
  verification, for each data zone, if it is in the aberration region; and
  in the affirmative, the spatial interpolation is performed in said data zone so as to attribute greater weights to the observable colours measured in the calibration zones located in the aberration region than to the observable colours measured in the calibration zones located outside the aberration region.

It is therefore possible to improve the results of the spatial interpolation even more, and therefore of the reading of the 2D graphic code in its entirety, by adapting the spatial interpolation if an aberration region is detected in the 2D graphic code. During the spatial interpolation more importance can be given to the observable colours of the calibration zones located in the aberration region (than those positioned outside) to estimate, in the data zones located in the aberration region, the theoretically observable colour for each of the base colours of the colour base.

According to a particular embodiment in which the data zones are combined into frames of at least two data zones, the zones of the 2D graphic code further comprising verification zones, at least one verification zone being associated with each of said frames;
  in which the spatial interpolation step is applied to the data zones and to the verification zones so as to produce an estimation of the theoretically observable colour in the current acquisition conditions for each colour of the colour base in the positions of the data zones and of the verification zones;
  in which the classification step is applied to the data zones and to the verification zones so as to determine, based on the spatial interpolation, the real colour attributed to the data zones and to the verification zones of the 2D graphic code,
  the method comprising an iterative process including during at least one current iteration:
    verification, for each frame of the 2D graphic code, of the validity of the real colours determined during the preceding classification for the data zones of said frame, based on the real colour determined during said preceding classification for said at least one verification zone of said frame;
    updating of the spatial interpolation by using, as calibration zone, all or some of the zones of the frames of which the colours of the data zones have been determined as being valid during said verification of the current iteration; and
    updating of the classification to determine, based on the result of the updated spatial interpolation, the real colour attributed to the data zones and to the verification zones of the 2D graphic code.

It is therefore possible to further improve the quality and efficacy of the reading method of the invention to the extent where the zones of the frames determined as being valid can be used as calibration zone in addition to the calibration zones present by definition in the 2D graphic code. The use of novel zones of the graphic code as calibration zones improves the spatial interpolation performed at each iteration of the iterative process and therefore decreases errors likely to occur during ensuing classification.

Thus the invention makes it possible to perform reliable and precise reading of a high-density 2D graphic code, irrespective of the acquisition conditions, with increased processing efficacy and more improved results.

Also, it is possible to limit the portion of the 2D graphic code restricted by configuration to the calibration zones, also ensuring acceptable reading performance. In fact, the calibration zones predefined originally in the 2D graphic code initiate execution of the iterative process. Once this iterative process is underway, data zones ZD and verification zones of valid frames can be processed as calibration zones during the spatial interpolation to progressively refine the results.

Because of the invention, the space reserved for the calibration zones in a 2D graphic code can therefore be limited and the quantity of information which can be stored in the data zones can accordingly be increased, also ensuring acceptable reading performance.

According to a particular embodiment, updating of the interpolation comprises:
  reiteration of the spatial interpolation by using, as calibration zone, all or some of the zones of the frames of which the colours of the data zones have been determined as being valid during said verification of the current iteration so as to update the estimation of the theoretically observable colour in the current acquisition conditions for each colour of the colour base on the surface of the 2D graphic code.

According to a particular embodiment, updating of the classification comprises:
  reiteration of the classification to determine, based on the result of the interpolation of the current iteration, the real colour attributed to the data zones and to the verification zones.

According to a particular embodiment, during verification the validity of each frame is verified by performing an integrity calculation on the real colours determined during said preceding classification for the data zones of the frame and by comparing the result of said integrity calculation to the real colour determined during said preceding classification for said at least one verification zone of said frame.

According to a particular embodiment, during updating of the spatial interpolation, at least the data zones of each frame of which the colours of the data zones have been determined as being valid during said verification are taken into account as calibration zones during updating of the spatial interpolation.

According to a particular embodiment, in which, during updating of the interpolation each data zone as well as said at least one associated verification zone of each frame of which the colours of the data zones have been determined as being valid during said verification are taken into account as calibration zones during updating of the spatial interpolation.

According to a particular embodiment, during updating of the spatial interpolation, the zones of each frame, the real colours of which have been determined as being invalid during the preceding classification, are excluded from the zones taken into account as calibration zone.

According to a particular embodiment, in which during updating of the classification the real colour determined as being attributed to at least one data zone is corrected based on said at least one verification zone associated with the frame of said data zone.

According to a particular embodiment, in which during a current iteration of the iterative process the validity of the colours determined during the preceding classification for the data zones of each frame of the 2D graphic code is verified, prior to perform updating of the spatial interpolation based on the result of the updated spatial interpolation.

According to a particular embodiment, in which the method comprises a plurality of iterations of the iterative process, said iterative process being repeated until all the frames of the 2D graphic code are determined as being valid during said verification of a current iteration, the real colours of each data zone and each verification zone being those determined during updating of the classification of the last iteration.

In a particular embodiment, the different steps of the reading method are determined by computer programme instructions.

As a consequence, another aim of the invention is a computer programme on an information medium (or recording medium), this programme being likely to be carried out in a reading device or more generally in a computer, this programme comprising instructions adapted to carry out the steps of a reading method such as defined in this document.

This programme can use any programming language and be in the form of source code, object code, or intermediate code between source code and object code, such as in a partially compiled form, or in any other preferred form.

Another aim of the invention is an information medium (or recording medium) readable by a computer and comprising computer programme instructions such as mentioned hereinabove.

The information medium can be any entity or device capable of storing the programme. For example, the medium can comprise storage means such as a ROM, for example a CD ROM or a microelectronic circuit ROM, or even magnetic recording means, for example a diskette (floppy disc) or a hard drive.

On the other hand, the information medium can be a transmissible medium such as an electrical or optical signal which can be conveyed via an electrical or optical cable, via radio or via other means. The programme according to the invention can in particular be downloaded over a network of Internet type.

Alternatively, the information medium can be an integrated circuit into which the programme is incorporated, the circuit being adapted to execute or to be used in the execution of the method in question.

The invention also relates to a reading device configured to carry out the reading method of the invention. More particularly, the invention also relates to a reading device for reading a 2D graphic code comprising a plurality of zones, each presenting a real colour which is attributed to it in a base of N distinct colours, N being an integer such that N≥2, said zones comprising:
  data zones encoding information based on the real colours of said data zones; and
  at least 2N calibration zones at predefined positions in the 2D graphic code, the real colour of each calibration zone being a predefined reference colour in said colour base, the 2D graphic code comprising at least 2 calibration zones for each colour of the colour base,
the device comprising:
  an optical acquisition device configured to perform optical acquisition of the 2D graphic code in current acquisition conditions to obtain image data;
  a measuring module configured to measure, based on the image data, the observable colour in the calibration zones in the current acquisition conditions;
  a spatial interpolation module configured to perform spatial interpolation, based on the observable colours measured in the calibration zones and the predefined positions of said calibration zones, so as to produce an estimation of the theoretically observable colour in the current acquisition conditions for each colour of the colour base in the data zones as a function of the position of said data zones; and
  a classification module configured to determine, based on the result of the spatial interpolation, the real colour attributed to at least one analyzed data zone, said classification module being configured to perform for each analyzed data zone:
    comparison of the observable colour measured in said analyzed data zone with the theoretically observable colour estimated for each colour of the colour base at the position of said analyzed data zone; and
    determination, as real colour of said analyzed data zone, of the colour of the colour base of which the theoretically observable colour estimated at the position of said analyzed data zone is the closest to the observable colour measured in said analyzed data zone.

The spatial interpolation produces an estimation of the theoretically observable colour in the current acquisition conditions for each colour of the colour base on the surface of the 2D graphic code, and in particular in the data zones as a function of the position of said data zones.

It should be noted that the different embodiments mentioned in this document in relation to the reading method of the invention as well as the associated advantages apply similarly to the reading device of the invention.

For each step of the reading method such as defined in this document, the reading device of the invention may comprise a corresponding module configured to perform said step.

According to a particular embodiment, the invention is carried out by means of software and/or hardware components. In this respect, in this document the term "module" can correspond both to a software component and a hardware component or to a set of hardware and software components.

A software component corresponds to one or more computer programs, one or more sub-programmers of a programme, or more generally to any element of a programme or software capable of carrying out a function or a set of functions, as described in this document for the module in question. Such a software component can be executed by a processor of a physical entity (terminal, server, etc.).

Similarly, a hardware component corresponds to any element of a hardware set (or hardware) configured to carry out a function or a set of functions, as described in this document for the module in question. It can be a programmable hardware component or with processor integrated for executing software, for example an integrated circuit, a smart card, a memory card, etc.

BRIEF DESCRIPTION OF THE DRAWINGS

Other characteristics and advantages of the present invention will emerge from the following description in reference to the appended drawings which illustrate exemplary embodiments devoid of any limiting character, in which:

FIGS. 8A and 8B illustrate aberration zones detected in a 2D graphic code of the invention placed respectively in uniform lighting conditions and in diverse lighting conditions, according to particular examples;

FIG. 9 schematically illustrates distribution of aberration zones in uniform lighting conditions and in diverse lighting conditions, according to particular examples;

DETAILED DESCRIPTION OF EMBODIMENTS

Figure 1:
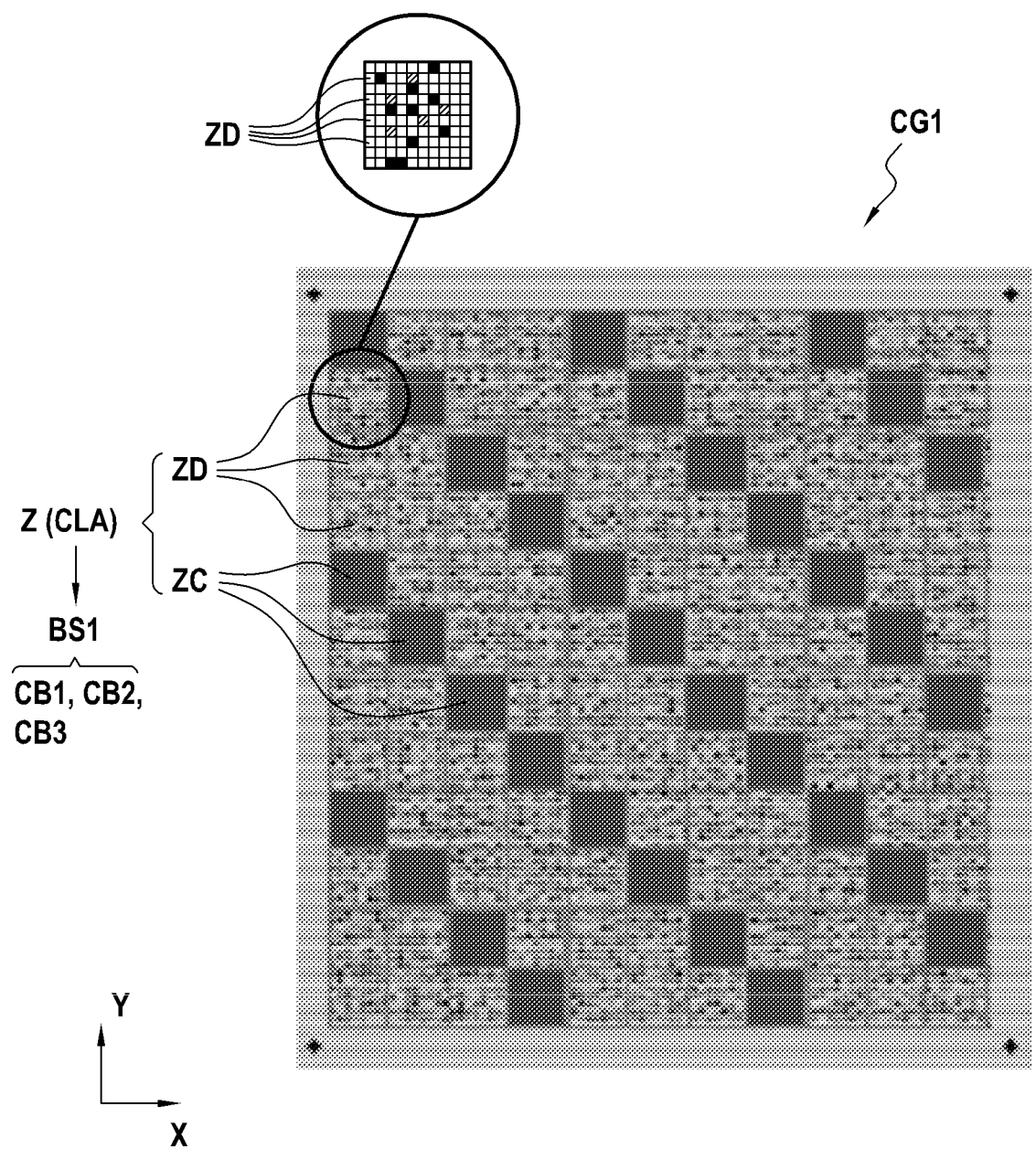
FIG. 1 schematically illustrates a 2D graphic code according to a particular embodiment of the invention.

As indicated previously, the invention relates to a reading method for reading a 2D graphic code, also called graphic code, so as to enable reliable and precise reading of information coded in the 2D graphic code in question.

In this document, the expression "2D graphic code" (or more simply "graphic code") designates any graphic code (or graphic representation) formed in 2 dimensions on a medium, in the form of an arrangement of pixels, symbols or any graphic patterns. This graphic arrangement stores or represents data which can be read later optically by a suitable reading process. A 2D graphic code can comprise symbols, characters, pixels or any graphic patterns which can represent information. A 2D graphic code can for example be a 2D barcode (or QR code) as already mentioned, or any pictogram.

According to different embodiments the invention carries out a reading process in a reading device for reading a 2D graphic code comprising a plurality of zones each presenting a real colour which is attributed to it in a base of N distinct colours. It is generally considered that N is an integer such that N≥2. The zones of the 2D graphic code comprise: data zones encoding information based on the real colours of said data zones, and at least 2N calibration zones at predefined positions in the 2D graphic code, the real colour of each calibration zone being a predefined reference colour in said colour base. The 2D graphic code comprises for example at least two calibration zones for each colour of the colour base.

The reading process comprises the following steps: optical acquisition of the 2D graphic code in current acquisition conditions to obtain image data; measuring, based on the image data, of the observable colour in the calibration zones in the current acquisition conditions; spatial interpolation, based on the observable colours measured in the calibration zones and the predefined positions of said calibration zones to produce an estimation of the theoretically observable colour in the current acquisition conditions for each colour of the colour base on the surface of the 2D graphic code (in particular in the data zones as a function of the position of said data zones); and classification based on the result of the spatial interpolation for determining the real colour attributed to at least one analyzed data zone.

The classification can comprise for each analyzed data zone a comparison of the observable colour measured in said analyzed data zone with the theoretically observable colour estimated for each colour of the colour base at the position of said analyzed data zone, and determination, as real colour of said analyzed data zone, of the colour of the colour base for which the theoretically observable colour estimated at the position of said analyzed data zone is the closest to the observable colour measured in said analyzed data zone.

It is therefore possible to reliably and precisely read a 2D graphic code, whether it is in colour or in black and white.

Another aim of the invention is a reading device configured to carry out the reading process of the invention, as well as the corresponding computer programme stored in an information medium.

Other aspects and advantages of the present invention will emerge from the exemplary embodiments described hereinbelow in reference to the drawings mentioned hereinabove.

Exemplary embodiments of the invention are described hereinbelow in terms of forming a 2D graphic code comprising a plurality of zones (also called pixels). In this document, the term "zone" (or pixel) designates any elementary graphic pattern which can be formed, by printing or any other process, on a medium. Each zone can be in any shape and can belong to a group of zones which can be in any arrangement. The zones or pixels can be arranged for example in the form of a matrix of zones or pixels, of orthogonal type or not. A zone or pixel can comprise a plurality of sub-zones or sub-pixels.

In the present document, exemplary embodiments of the invention are described in terms of a 2D graphic code of square or rectangular form, and also presenting square or rectangular zones. These zones are arranged according to an orthogonal matrix. It should be noted however that the number, the form and the arrangement of the zones, as well as the general geometric configuration of the 2D graphic code, can be adapted to case by case, with other exemplary embodiments being possible.

In the following exemplary embodiments, each zone (or pixel) of a 2D graphic code presents a real colour (or physical colour) which is attributed to it, that is, a colour which it bears really physically (a unique colour particular to it). The real colour of a zone of a 2D graphic code is intrinsic to said zone and is therefore independent of the acquisition conditions in which this colour can optionally be read.

It should be noted that the invention applies especially to those 2D graphic codes having multiple grey levels, that is, 2D graphic codes of which the zones each present a level of grey selected from a base of a plurality of separate grey levels. Also, in the present document the notion of colour also covers the grey levels. Therefore, a base of N grey levels can be used as a colour base BS1 in the exemplary embodiments described hereinbelow.

As already discussed hereinabove, when a 2D graphic code is read by a suitable reading device, the colours of each zone of the 2D graphic code can be read to deduce information from them. A reading device reads (or has the acquisition read of) the observable colours of the zones of a 2D graphic code in current acquisition conditions. These current acquisition conditions are a function especially of the hardware and software configurations of the reading device used as well as lighting conditions in which the 2D graphic code is read. Due to the measurement variations linked to the current acquisition conditions, the observable colours of the zones of a 2D graphic code—that is, the colours effectively detected during reading—can differ more or less relative to the real colours of the zones. Therefore, whereas a zone exhibits for example a real red colour, a reading device can measure a more or less light colour, or even pink, orange, magenta, etc.

Unless otherwise stated, the elements common or similar to several figures bear the same reference numerals and present identical or similar characteristics, such that these common elements are generally not described again for the sake of simplicity.

FIG. 1 schematically illustrates a 2D graphic code—noted CG1—according to a particular embodiment of the invention. In this example, the graphic code CG1 has a plurality of zones Z each presenting a real colour CLA which is attributed to it in a colour base BS1 of N distinct base colours (N being a positive integer). Each zone Z comprises a single real colour CLA which can be read and evaluated by a suitable reading device.

In general, it is considered that the integer N is such that N≥2. According to a particular example, N≥3. As indicated hereinbelow, the colour base BS1 being used can vary according to case. In particular, the number and the nature of the base colours comprising this colour base BS1 can be adapted case by case. This colour base BS1 can comprise for example any two base colours only, for example black and white (or blue and red, etc.). According to another example, the colour base BS1 comprises at least 3 distinct base colours (for example blue, green and red).

It is assumed for instance in this example that each zone Z of the graphic code CG1 presents a real colour CLA in the colour base BS1 which is composed of 3 distinct base colours noted CB1, CB2 and CB3 (FIG. 1). Other examples are possible of course. In particular, the invention can be applied with a colour base BS1 comprising for example 32, 64, 128 distinct base colours, or more, according to the density of information to be stored in the graphic code CG1. The larger the number of distinct base colours in the base BS1, the more it is possible to store data in the same surface of the graphic code but the more difficult the reading can prove (the deviation between the base colours is slight). By way of simplicity, the case of a base of 3 base colours is under consideration here (for example red, green and blue), given that the principle of the invention described here applies to all bases BS1 of 2 colours, 3 colours and more.

The graphic code CG1 comprises different types of zone Z. As illustrated in FIG. 1, the graphic code CG1 comprises data zones ZD encoding information based on the real colours CLA of said data zones. Also, the graphic code CG1 comprises at least 2N calibration zones (or reference zones) ZC at predefined positions in the graphic code CG1, the real colour CLA of each calibration zone ZC being a predefined reference colour in the colour base BS1. In the example in question here, the graphic code CG1 comprises at least 2 calibration zones ZC for each colour (CB1-CB3) of the colour base BS1, that is, at least 2 calibration zones ZC presenting the base colour CB1, at least 2 calibration zones ZC presenting the base colour CB2 and at least 2 calibration zones ZC presenting the base colour CB3 (or in total at least 2*3=6 distinct calibration zones ZC in this example).

In this example, the size of the data zones ZD is less than that of the calibration zones ZC, even though other examples are possible. The data zones ZD are arranged in groups of data zones, each group jointly forming a region of similar size and form as a calibration zone ZC. The size and configuration of the data zones ZD and the calibration zones ZC can however be adapted according to case.

As described hereinbelow, the data zones ZD of the graphic code CG1 carry the useful information of the graphic code, specifically the information to be coded in the graphic code so that it can be read and interpreted later by means of a reading device. In addition, the calibration zones ZC are arranged at predefined positions and also exhibit real colours (called reference colours) which are known in advance. These calibration zones ZC improve reading by a reading device of the data zones ZD of the graphic code CG1.

As described hereinbelow, the calibration zones ZC can be distributed uniformly over the entire surface of the graphic code CG1. By way of variant, the calibration zones ZC can be distributed randomly over the surface of the 2D graphic code. Particular examples of configurations will be described later.

Figure 2:
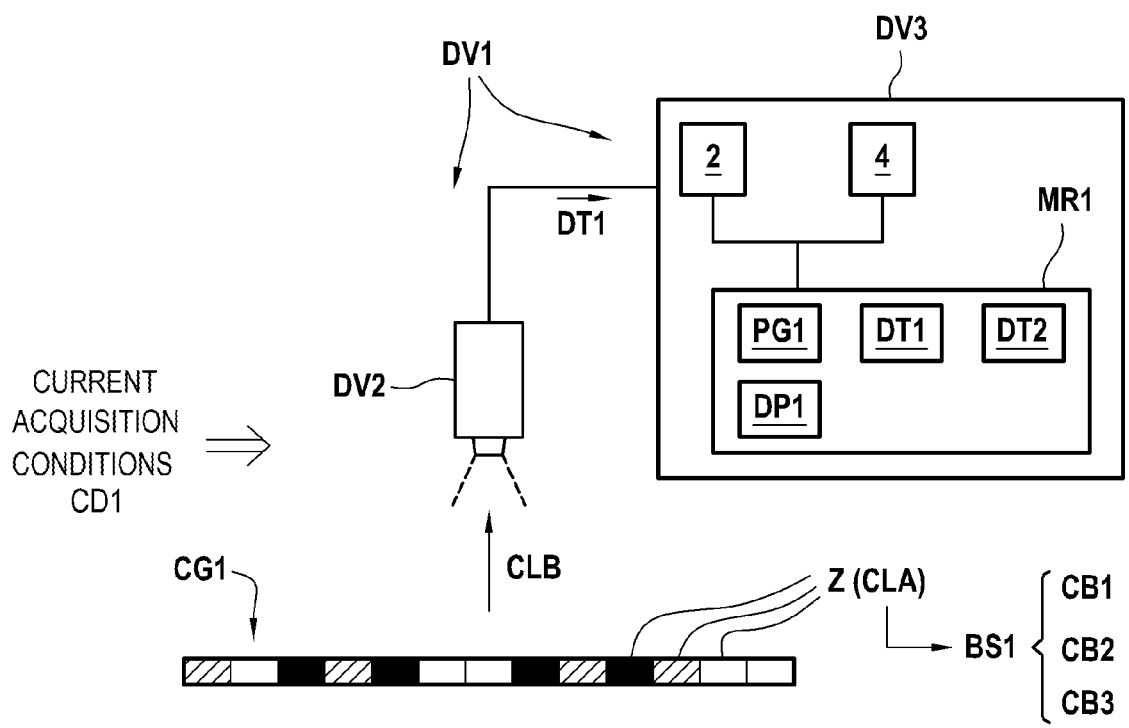
FIG. 2 schematically illustrates the structure of a reading device according to a particular embodiment of the invention.

FIG. 2 illustrates a reading device (or system) DV1 according to a particular embodiment of the invention. The reading device DV1 is configured to read a 2D graphic code such as the graphic code CG1 by carrying out the reading process according to a particular embodiment of the invention.

The reading device DV1 comprises an optical acquisition device DV2 (or shooting device) as well as a processing unit DV3. The optical acquisition device DV2 can comprise a camera or any other apparatus capable of performing the optical acquisition of a graphic code such as the graphic code CG1.

The optical acquisition device DV2 is configured to execute the optical acquisition of the graphic code CG1 in current acquisition conditions CF1 to obtain image data DT1. In particular, during reading the optical acquisition device DV2 collects light representative of the colours CLB which are effectively observable in the different zones Z of the graphic code CG1 in current acquisition conditions noted CD1. The processing unit DV3 is configured to process the image data DT1 generated by the optical acquisition device DV1 during optical acquisition to read the graphic code CG1 in question.

The optical acquisition device DV2 and the processing unit DV3 can constitute two distinct entities able to cooperate together to perform the reading process of the invention. Alternatively, the acquisition device DV2 and the processing unit DV3 can be integrated into one and the same device DV1. In the following examples it is assumed that the processing unit DV3 controls the reading device DV2.

The current acquisition conditions CD1 depend in particular on the lighting conditions in which the taking of the graphic code CG1 is performed, as well as of the (hardware and software) configuration of the processing unit DV3. Other acquisition parameters can however influence the current acquisition conditions CD1. It is understood that the acquisition conditions CD1 can vary from one take to another, especially due to variations in lighting conditions in which readings of graphic code are performed. Similarly, hardware and/or software modifications of the processing unit DV3 (for example following a software update) can impact the acquisition conditions CD1.

In this example the processing unit DV3 comprises a processor (or controller) 2, a volatile memory (RAM) 4 and a non-volatile memory MR1. The processing unit DV3 can be a computer or take all other suitable forms.

In this example, the memory MR1 is a rewritable non-volatile memory or a read-only memory (ROM).

The memory MR1 is a rewritable non-volatile memory (EEPROM, Flash, etc.) or a read-only memory (ROM), this memory constituting a recording medium (or information medium) according to a particular embodiment, readable by the processing unit (and more generally by the reading device DV1), and on which a computer programme PG1 according to a particular embodiment is recorded. This computer programme PG1 comprises instructions for execution of the steps of a reading process according to a particular embodiment. The processor can use the volatile memory 4 to execute instructions defined in the computer programme PG1 stored in the memory MR1.

The memory MR1 can especially be used for storing position data DP1, image data DT1 generated by the optical acquisition device DV2 as well as interpolation data DT2. The nature and usage of these data will be described in more detail later.

Figure 3:
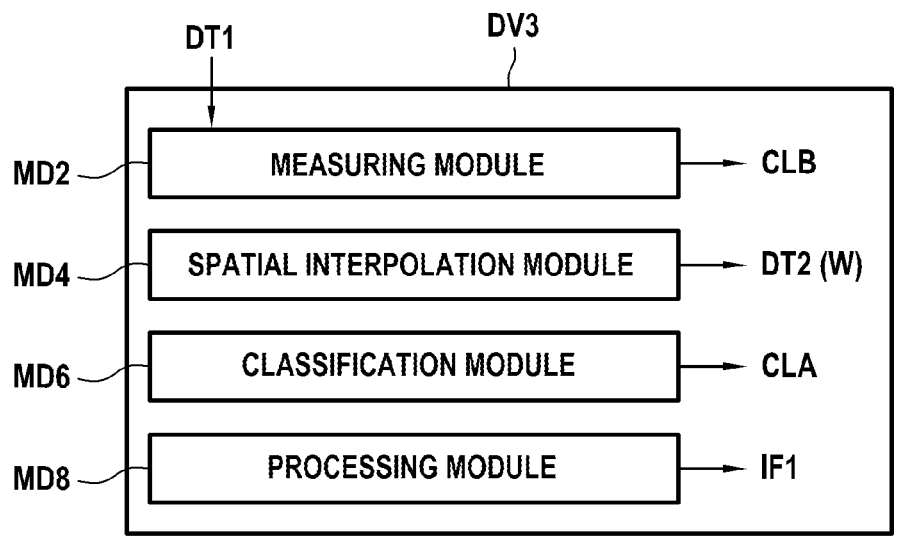
FIG. 3 schematically illustrates the modules carried out in a reading device according to a particular embodiment of the invention.

The processor 2 controlled by the computer programme PG1 here implements a certain number of modules shown in FIG. 3, specifically a measuring module MD2, a spatial interpolation module MD4, a classification module MD6 and a processing module MD8.

The measuring mode MD2 is configured to measure the observable colour CLB in the calibration zones ZC in the current acquisition conditions CD1 based on the image data DT1 generated by the optical acquisition device DV2.

The spatial interpolation module (or interpolation module) MD4 is configured to produce, based on the observable colours CLB measured in the calibration zones ZC and the predefined positions of the calibration zones ZC, an estimation (spatial interpolation) of the theoretically observable colour CLC in the current acquisition conditions CD1 for each colour of the colour base BS1 on the surface of the graphic code CG1 (in particular in the data zones as a function of the position of the data zones ZD in the 2D graphic code).

As described in more detail hereinbelow, a theoretically observable colour CLC in terms of the invention is a colour which has not been effectively measured by the reading device DV1 in a zone Z of the graphic code CG1 but a colour which the reading device DV1 theoretically ought to observe, according to the results of the spatial interpolation, if a corresponding colour (from CB1-CB3) of the colour base BS1 were really attributed in this zone of the graphic code CG1. For each colour CB1-CB3 of the colour base BS1 a theoretically observable colour CLC can be evaluated by spatial interpolation in the data zones ZC of the graphic code CG1 (as a function of the position of said data zones ZD), based on the observable colours CLB effectively measured in the calibration zones ZC.

The classification module MD6 is configured to determine, based on the result of the spatial interpolation performed by the interpolation module MD4, the real colour CLA attributed to at least one analyzed data zone ZD. For each analyzed data zone ZD, the classification module MD6 can be configured to:
  compare the observable colour CLB measured in said analyzed data zone ZC to the theoretically observable colour CLC estimated for each colour CB1-CB3 of the colour base BS1 at the position of said analyzed data zone ZD; and
  determine, as real colour CLA of said analyzed data zone ZD, the colour of the colour base BS1 for which the theoretically observable colour CLC estimated at the position of said analyzed data zone ZD is the closest to the observable colour CLB measured in said analyzed data zone ZD.

The processing unit DV3 can optionally also comprise an acquisition module configured to control the optical acquisition device DV2 so that the latter completes the optical acquisition of the graphic code CG1 in current acquisition conditions CD1 to obtain image data DT1.

The configuration and the operation of the modules MD2-MD8 of the processing unit DV3 will appear more precisely in the exemplary embodiments described hereinbelow in reference to FIGS. 4-11. It should be noted that the modules MD2-MD8 such as shown in FIG. 3 illustrate only one non-limiting exemplary embodiment of the invention.

In general, for each step of the reading process of the invention the reading device of the invention can comprise a corresponding module configured to perform said step.

Figure 4:
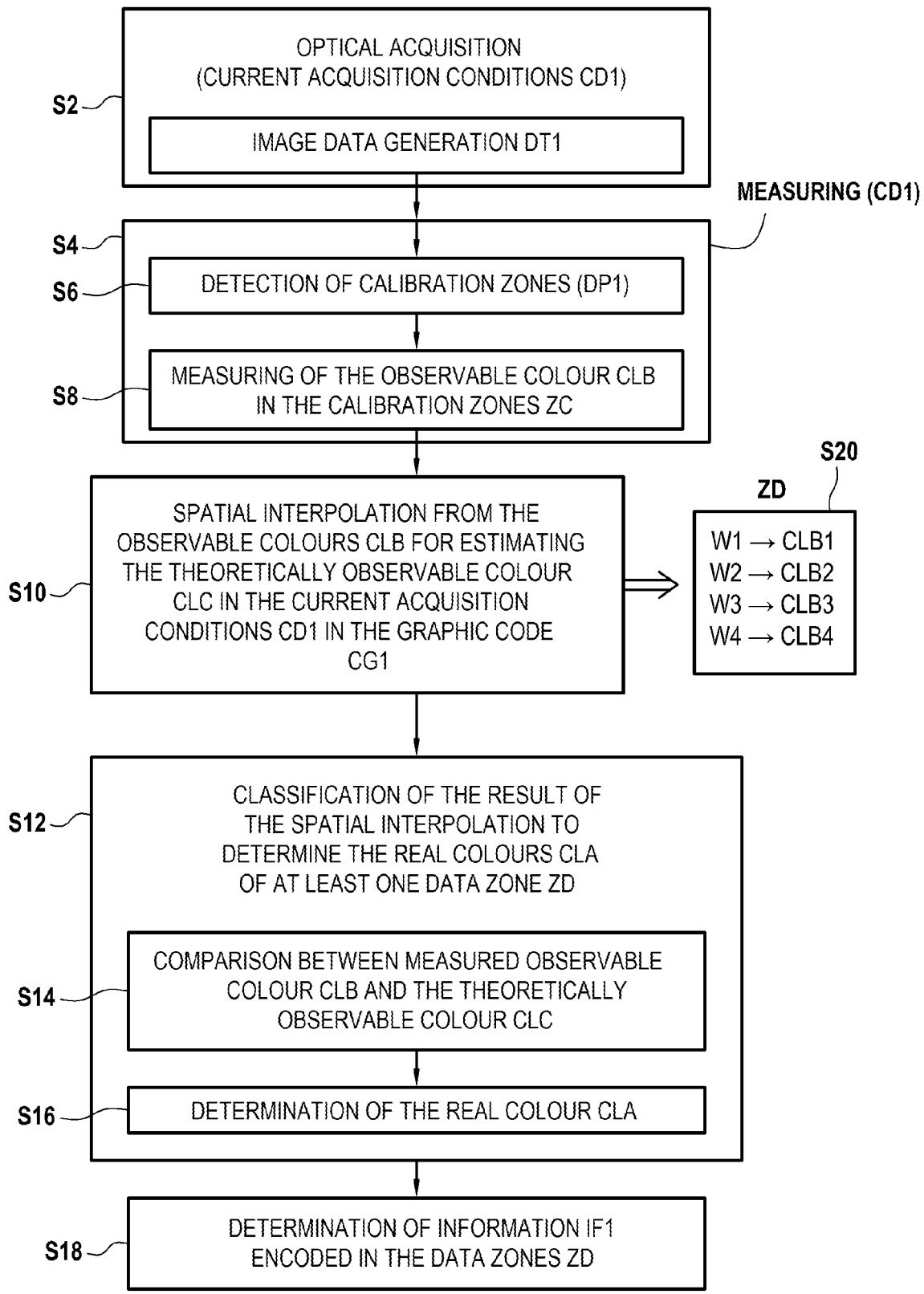
FIG. 4 is a diagram schematically illustrating the steps performed by a reading device for carrying out a reading method according to a particular embodiment of the invention, for example in light of reading a 2D graphic code such as illustrated in FIG. 1.
Figure 5:
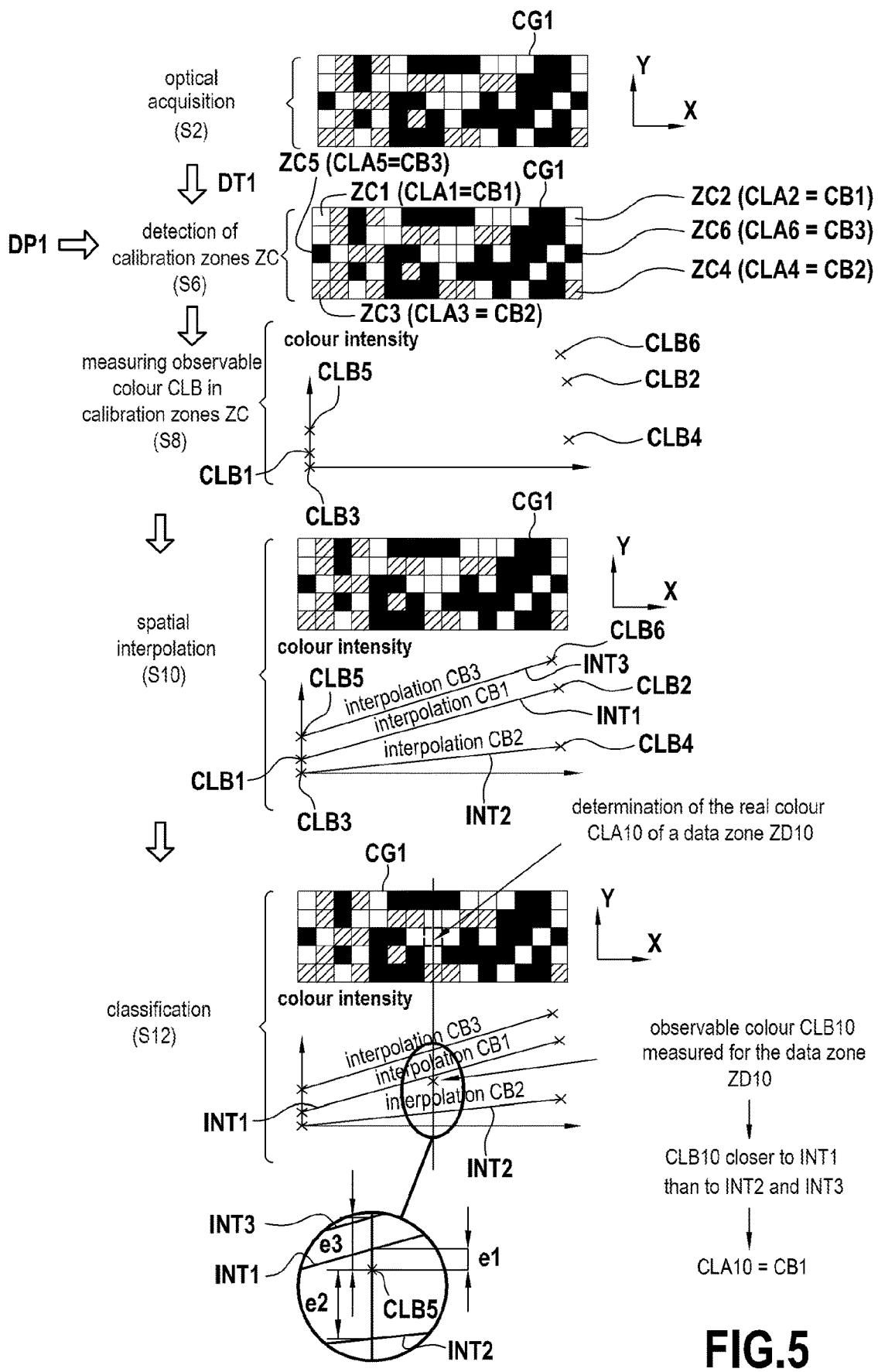
FIG. 5 schematically illustrates the steps of the reading method shown in FIG. 4, according to a particular embodiment of the invention.

A particular embodiment is now described in reference to FIGS. 4-5. It is assumed that the reading device DV1 previously described (FIGS. 2-3) is used for reading the graphic code CG1 shown in FIG. 1. For this to occur, the processing unit DV3 carries out a reading process by executing the computer programme PG1.

FIG. 5 illustrates in particular the steps of the reading process shown in FIG. 4, according to a particular example. In FIG. 5 a portion of the graphic code CG1 is shown schematically purely by way of illustration to illustrate the concept of the invention carried out in the particular case of the process shown in FIG. 4. As already indicated, the configuration of the zones Z (including the calibration zones ZC and the data zones ZD) in terms especially of number, size, form, etc. can be adapted by the skilled person case by case.

During a step S2 of optical acquisition (FIGS. 4-5), the optical acquisition device DV2 performs optical acquisition of the graphic code CG1 in current acquisition conditions CD1 to obtain image data DT1. The optical acquisition device DV2 accordingly generates the image data DT1 which are collected by the processing unit DV3. In this example, the image data DT1 are representative in particular of the observable colours CLB by the reading device DV1 in each zone Z of the graphic code CG1 in the current acquisition conditions CD1. During this acquisition step S2, the acquisition device DV2 comprises for example a camera, photo apparatus or other, which takes a shot or shots of the surface of the graphic code CG1.

During a measuring step S4 (FIGS. 4-5), based on the image data DT1 the processing unit DV3 then measures the observable colour CLB in the calibration zones ZC in the current acquisition conditions CD1. The processing unit DV3 can measure the observable colour CLB in all the calibration zones ZC of the graphic code CG1, or in a sub-group of calibration zones ZC of all the calibration zones ZC present in the graphic code CG1.

In the example considered here, during the measuring step S4 the processing unit DV3 measures, based on the image data DT1, the observable colour CLB in all the zones Z of the graphic code CG1, including in the calibration zones ZC and in the data zones ZD. As will appear hereinbelow, it is not however obligatory to measure the observable colour CLB in each data zone, according to the positions where the aim is to read information in the graphic code CG1. By way of variant, it is possible to measure the observable colour CLB only in a sub-section of the data zones ZD present in the graphic code CG1.

Measuring a colour in a zone Z of the graphic code CG1 is reflected by determining values of intensity of colour representative of the observable colour CLB which is effectively measured in a zone Z in question in the current acquisition conditions CD1. Each colour CLB measured in a zone Z can be represented in this example by respective intensities of colour (by a n-uplet of intensities where n is a natural number at least equal to 1, for example a triplet with n=3 or quadruplet with n=4) in a colorimetric reference base which can be selected by the skilled person case by case (for example the base "RGB" for red-green-blue with n=3, the base CMYK with n=4, the greyscale base with n=1, etc.). The n-uplet is the representation (the coordinates) of the observable colour CLB in the colorimetric reference base. For example, each colour CLB measured can be represented by a triplet of intensities of red-green-blue colour in the event where the colorimetric reference base used is red-green-blue.

As already indicated, each calibration zone ZC comprises a unique reference colour CLA which is predefined among the base colours CB1-CB3 of the colour base BS1. During the measuring S4, the processing unit DV3 preferably measures the observable colour CLB in a group of calibration zones ZC comprising at least two calibration zones ZC respectively presenting each of the base colours CB1-CB3 of the colour base BS1 (at least two calibration zones ZC presenting the base colour CB1, CB2 and CB3 respectively), so as to carry out spatial interpolation in all the colours of the colour base BS1 during the following step S10.

During the measuring step S4 the processing unit DV3 can perform various processing events for measuring the observable colours CLB in the calibration zones ZC. For example, the processing unit DV3 can perform processing to detect the graphic code CG1 (cropping, etc.) and process the image data DT1 to prepare the measuring S4 (correction of perspective, standardization of size, segmentation of the graphic code CG1, etc.). It is assumed that the processing unit DV3 is preconfigured to know the positions of the different zones Z (and especially of the calibration zones ZC) of the graphic code CG1 based on the received image data DT1.

During processing of the image data DT1, the processing unit DV3 can detect (S6, FIGS. 4-5) the calibration zones ZC in the graphic code CG1 based on the image data DT1 and based on position data DP1 previously recorded (in the memory MR1 in this example). The processing unit DV3 can then measure (S8, FIGS. 4-5) the observable colour CLB in the calibration zones ZC. These position data DP1 already mentioned hereinabove comprise the predefined positions of each calibration zone ZC in the 2D graphic code. These position data DP1 can be in any format. They comprise for example coordinates of each zone Z (including calibration zones ZC) of the graphic code GC1.

In the example shown in FIG. 5, the processing unit DV3 detects two calibration zones ZC1 and ZC2 the real colours of which noted respectively CLA1 and CLA2 are the base colour CB1, two calibration zones ZC3 and ZC4, the real colours of which noted respectively CLA3 and CLA4 are the base colour CB2 and two calibration zones ZC5 and ZC6, the real colours of which noted respectively CLA5 and CLA6 are the base colour CB3. For simplicity, a minimal case is considered here where only two calibration zones ZC are each attributed respectively with the base colours of the colour base BS1. It is understood however that it is possible to predefine a larger number of calibration zones ZC for each of the base colours of the colour base in question.

During a spatial interpolation step S10 (FIGS. 4-5) the processing unit DV3 performs spatial interpolation, based on the observable colours CLB measured in the calibration zones ZC and the predefined positions of the calibration zones ZC, to produce an estimation of the theoretically observable colour CLC in the current acquisition conditions CD1 for each colour (CB1-CB3) of the colour base BS1 on the surface of the graphic code CG1, more particularly in the data zones ZD. This spatial interpolation estimates the theoretically observable colour CLC for each base colour in the data zones ZD as a function of the respective position of the data zones ZD in the 2D graphic code CG1.

The processing unit DV3 knows in advance the real colours CLA which are attributed to each calibration zone ZC of the graphic code CG1. For this to occur, the processing unit DV3 for example consults pre-recorded calibration data which define the respective real colour CLA attributed to each calibration zone ZC of the graphic code GC1. Therefore, the processing unit DV3 can associate each observable colour CLB measured at S4 with a corresponding colour (CB1-CB3) of the colour base BS1. According to a particular example, the calibration data comprise the position data DP1 for each calibration zone ZC in association with the reference colour attributed to the calibration zone in question, the spatial interpolation S10 being performed based on these calibration data.

The processing unit DV3 can accordingly determine at S10, in the current acquisition conditions CD1, how each base colour of the colour base BS1 in the positions of the data zones ZD of the graphic code CG1 must theoretically appear (as a function of said position of the data zones ZD). For each base colour (CB1-CB3) of the colour base BS1, the processing unit DV3 evaluates, by spatial interpolation based on the observable colours CLB measured at S4 for said base colour in the calibration zones ZC, how this base colour appears theoretically—always in the current acquisition conditions CD1—in the positions of the data zones ZD.

As illustrated in FIG. 5, it is therefore assumed here that the processing unit DV3 performs spatial interpolation to estimate respectively the theoretically observable colour CLC in the current acquisition conditions CD1 for each base colour CB1-CB3 of the colour base BS1 on the surface of the graphic code CG1, and in particular in the positions of each data zone ZC. This spatial interpolation estimates the theoretical visual rendition of each base colour CB1-CB3 as a function of the position of the data zones ZD in the graphic code CG1. An estimation of the theoretically observable colour CLC in the current acquisition conditions CD1 for each colour of the colour base BS1 is therefore produced in the positions of each data zone ZC of the graphic code CG1 as a function of said positions of the data zones ZC in the 2D graphic code CG1.

This spatial interpolation S10 can be performed in various ways. As illustrated in FIG. 5, the processing unit DV3 can for example perform linear interpolation for each base colour of the colour base BS1 based on the values measured at S4 (that is, the observable colours CLB) in the calibration zones ZC presenting said base colour as a real colour CLA. In this example 3 this spatial interpolation step S10 produces linear interpolations INT1, INT2 and INT3 representing respectively the visual rendition in the current acquisition conditions CD1 of the base colours CB1, CB2 and CB3 on the surface of the graphic code CD1 (in particular at the positions of the data zones ZD). Other types of spatial interpolations can be implemented, however. The spatial interpolation INT1 for the base colour CB1 is generated in this example based on the values of the observable colours CLB1 and CLB2 measured at S4 for the calibration zones ZC1 and ZC2 respectively. The spatial interpolation INT2 for the base colour CB2 is generated based on the values of the observable colours CLB3 and CLB4 measured at S4 for the calibration zones ZC3 and ZC4 respectively. The spatial interpolation INT3 for the base colour CB3 is generated based on the values of the observable colours CLB5 and CLB6 measured at S4 respectively for the calibration zones ZC5 and ZC6. As illustrated in FIG. 5, the estimations produced by spatial interpolation (of linear type in this example) in the data zones are a function of the respective position of the data zones ZD on the surface of the 2D graphic code CG1.

By way of simplicity, the linear interpolations INT1, INT2 and INT3 shown in FIG. 3 are generated based on only two values of observable colour CLB effectively measured at S4. It is understood however that a larger number of values CLB can be taken into account to heighten the precision of the interpolation.

According to a particular example, it is possible to assign (S20, FIG. 4) weights (or weightings) W to the observable colours CLB measured in the calibration zones ZC for a given base colour to produce an estimation of the theoretically observable colour CLC in the current acquisition conditions CD1 for said base colour on the surface of the graphic code CG1. The weight W of the calibration zones ZC during the spatial interpolation S10 in the positions of each data zone ZC can be adapted. By assigning weights W in this way (not all equal), the importance of the observable colours CLB measured in the calibration zones ZC in calculating the spatial interpolation of each base colour can be adapted, improving the quality of the spatial interpolation even more.

The spatial interpolation S10 can for example be performed so as to attribute, for at least one data zone ZD, weights W different to the observable colours CLB measured in the calibration zones ZC as a function of the distance separating the calibration zones ZC from said data zone ZD in question.

According to a particular example, during the spatial interpolation S10, the estimation of the theoretically observable colour CLC for each base colour of the colour base BS1 is adapted (S20, FIG. 4) in each data zone ZD such that a greater weight W is attributed to an observable colour CLB measured in a first calibration zone ZC1 presenting a reference colour in the colour base BS1 relative to an observable colour CLB measured in at least one other second calibration zone ZC2 presenting this same reference colour if the first calibration zone ZC1 is closer to the data zone ZD in question than said at least one second calibration zone ZC2. This particular adaptation of the weights W during the spatial interpolation S10 attributes greater importance to the observable colours CLB effectively measured in the calibration zones ZC near a data zone ZD in question than to the observable colours CLB effectively measured in calibration zones ZC at a distance from this data zone ZD, which can further improve the quality of the spatial interpolation.

According to a particular example, the calibration zones ZC are distributed uniformly over the surface of the graphic code CG1, which makes spatial interpolation easier and produces more uniform, and therefore more reliable, results over the entire surface of the graphic code CG1, and more particularly in the region of the data zones ZD. In this way, the graphic code CG1 can comprise a uniform matrix of calibration zones ZC for each base colour of the colour base BS1. In particular, constant spacing can be maintained between each pair of consecutive calibration zones of the same base colour.

By way of variant, the calibration zones ZC are distributed randomly over the surface of the graphic code CG1, which saves the information stored in the graphic code CG1 to the extent where it can be more difficult for a dishonest third party to determine where the calibration zones in the graphic code CG1 are. But irrespective of the selected configuration it is necessary for the reading device DV1 to know the predefined positions of the calibration zones ZC in advance so it can carry out the reading process.

It is also possible to adapt the number of calibration zones ZC and/or their size. The larger the space reserved for the calibration zones ZC in the graphic code CG1 per base colour in question, the higher the quality of the spatial interpolation S10.

During a classification step S12 (FIGS. 4-5), the processing unit DV3 then performs classification, based on the result of the spatial interpolation S10, for determining the real colour CLA (otherwise called the class) attributed to at least one analyzed data zone ZD in the graphic code CG1. The processing unit DV3 can therefore analyze a data zone ZD or a plurality of them according to the position of the information to be read in the graphic code CD1. It is assumed in this example that during the classification S12 each data zone ZD of the graphic code CG1 is analyzed to determine its real colour CLA attributed in the colour base BS1.

During the classification S12, for each analyzed data zone ZD the processing unit DV3 performs a comparison step S14 and a determination step S16. More precisely, the processing unit DV3 compares (S14) the measured observable colour CLB (at S4) in said analyzed data zone ZD to the theoretically observable colour CLC estimated by interpolation (at S10) for each base colour CB1-CB3 of the colour base BS1 at the position of said analyzed data zone ZD. The processing unit DV3 then determines (S16), as real colour CLA of said analyzed data zone ZD, the base colour of the colour base BS1 for which the theoretically observable colour CLC estimated at the position of said analyzed data zone ZD is the closest to the observable colour CLB measured in said analyzed data zone ZD.

Therefore, as shown in FIG. 5, the processing unit DV3 determines (S14) in this example based on the spatial interpolations INT1, INT2 and INT3 an estimation of the theoretically observable colours CLC for each of the base colours CB1, CB2 and CB3 at the position of a data zone ZD10 during analysis. The processing unit DV3 can then compare (S14) the observable colour CLB10 measured (at S4) in said analyzed data zone ZD10 to the interpolated values CLC1, CLC2 and CLC3 obtained respectively for each of the base colours CB1, CB2 and CB3 at the position of the data zone ZD10. In this example the processing unit DV3 determines (S16) that it is the value of the theoretically observable colour CLC1 obtained for the base colour CB1 which is the closest to the value of the observable colour CLB10 effectively measured at S4 for the data zone ZD10 in question. The processing unit DV3 deduces from this that the data zone ZD10 presents the base colour CB1 as real colour CLA10.

As illustrated in FIG. 5, during the comparison step S14 the processing unit DV3 can determine a deviation in respective colour e1, e2 and e3 between the observable colour CLB10 measured in the data zone ZD10 and the theoretically observable colour CLC1, CLC2 and CLC3 estimated for each base colour CB1, CB2 and CB3 at the position of the data zone ZD10. The real colour CLA10 determined (at S16) as colour attributed to the analyzed data zone ZD10 is therefore the base colour for which the deviation is the lowest. In this example, with the deviation e1 being less than e2 and e3 it is the base colour CB1 which is identified as being the real colour CLA10 of the data zone ZD10. This comparison step S14 can be performed in each data zone ZD to be read.

As illustrated in FIG. 4, once the real colour CLA of the data zones ZD has been determined (S12) the processing unit DV3 can deduce particular information IF1 from this. In other words, the processing unit DV3 can determine information IF1 encoded in the graphic code CG1 based on the real colour CLA determined during the classification S12 as being attributed to each analyzed data zone ZD. According to a particular example, all the data zones ZD are analyzed so that the processing unit DV3 can read all the information coded in the graphic code CG1.

The present invention makes it possible to reliably and precisely read a 2D graphic code, whether it is colour or black and white, and irrespective of the acquisition conditions in which the reading is performed. Because of the spatial interpolation performed based on the observable colours measured in the calibration zones, it is possible to obtain reliable and uniform reading results for the same 2D graphic code despite the differences in hardware and/or software configuration which can exist between different reading devices used (especially in the region of the photographic device and the processing algorithm). The uniform and repetitive character of the reading results is also assured under lighting conditions varying from one reading operation to another. Reliable and precise reading can also be performed even under complex lighting conditions during a reading operation (for example when the lighting to which the 2D graphic code is exposed is not uniform).

It has been noticed especially that uniform lighting (for example causing overexposed zones and/or under-exposed zones in terms of light) significantly increases the risks of errors during reading of a 2D graphic code. The invention rectifies this problem by making the reading results independent of the lighting used.

The invention also reads information stored in colour graphic codes (including graphic codes with multiple grey levels), by limiting the errors likely to occur, due especially to the resemblance of base colours used (for example when many base colours are being used) or again when the lighting is not uniform. It is therefore possible to store a larger quantity of information in a given surface.

In particular, it has been noted that colour graphic codes are difficult to read due to the strong influence of lighting conditions and the (hardware and software) configuration of the reading device used on the colours read in these graphic codes. The invention rectifies these problems.

In addition, the invention saves the information stored in the 2D graphic code of the invention. Without knowing the position of the calibration zones and the data zones in a 2D graphic code of the invention in advance, it is difficult for a dishonest third party to read the information stored in this graphic code.

Figure 6:
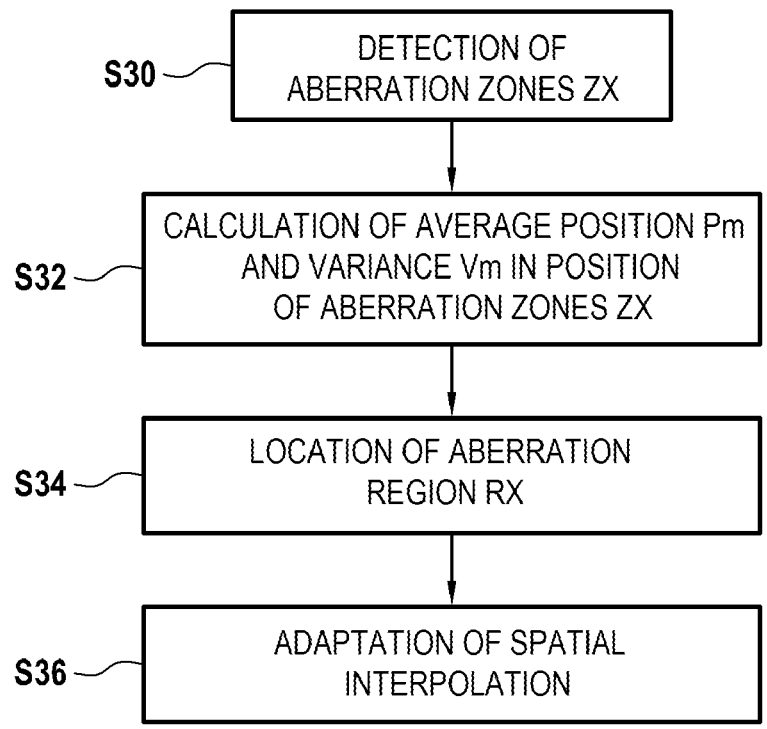
FIG. 6 is a diagram schematically illustrating the steps performed by a reading device for carrying out a reading method, according to a particular embodiment of the invention.

FIG. 6 illustrates a reading process carried out by the reading device DV1 shown in FIGS. 2-3 according to a particular embodiment. The steps carried out in this embodiment are now described in reference to FIGS. 6-9.

As already indicated, the lighting conditions constitute a determining factor during the reading of a 2D graphic code. If the 2D graphic code forming the subject of the reading is not lit evenly, more or less substantial variations in light exposure can impact diverse regions of the graphic code, which can degrade the quality of the reading.

According to this embodiment, the reading device DV1 adapts the manner in which the spatial interpolation is performed (S10, FIGS. 4-5) as a function of the light exposure conditions of the 2D graphic code. In particular, the reading device DV1 analyses the aberration zones likely to occur at various positions of the 2D graphic code and as a consequence adapts the spatial interpolation to ensure reliable and precise reading results.

For this to occur, the reading device DV1 can take into account the aberration zones ZX likely to appear at the reading in some zones of the graphic code in question (as described in more detail hereinbelow). These aberration zones ZX are zones of the graphic code in which the measured observable colour CLB (that is, the intensity of observable colours), is abnormally weak (or far away) relative to those of the same class (same real colour CLA) of the 2D graphic code in its entirety.

Figure 7A:
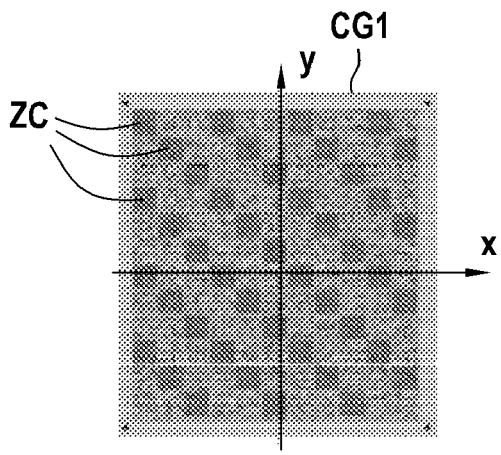
FIGS. 7A and 7B illustrate a 2D graphic code of the invention placed respectively in uniform lighting conditions and in diverse lighting conditions.

Therefore, as illustrated in FIGS. 7A and 8A, if the graphic code CG1 previously described is subjected to uniform light exposure conditions, during the reading all the calibration zones ZC of the graphic code CG1 exhibit uniform (close to each other) observable colours CLB (that is, intensities of observable colours). In particular, each calibration zone ZC presenting the same real colour CLA appears at the reading with a similar observable colour CLB. In this case, it has been noted that the aberration zones ZX (FIG. 8) likely to appear at the reading in some zones of the graphic code CG1 are distributed uniformly over the surface of the graphic code CG1.

Figure 7B:
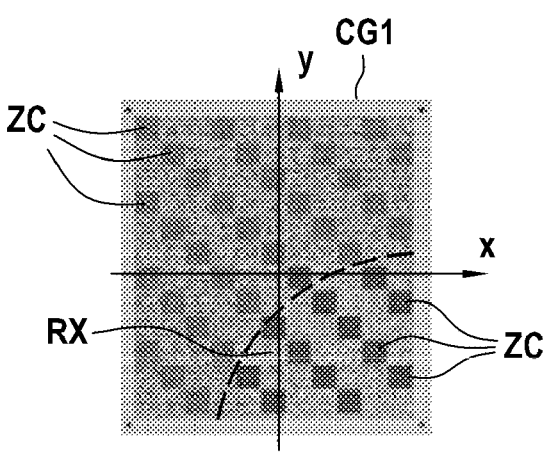

Yet, as illustrated in FIGS. 7B and 8B, if the graphic code CG1 previously described is subjected to uniform light exposure conditions, during the reading the calibration zones ZC of the graphic code CG1 exhibit observable colours CLB. In the example shown in FIG. 7B, the lower right corner presents a region RX, called aberration region, which is under-exposed relative to the rest of the graphic code CG1. Also, the calibration zones ZC positioned in the aberration region RX present a colour intensity substantially lower (and therefore darker colours) than that of the calibration zones ZC located outside this aberration region RX. As illustrated in FIG. 8B, it has been noticed in this case that the aberration zones ZX likely to appear at the reading in some zones of the graphic code CG1 are combined in the aberration region RX. As illustrated in FIG. 9, this is reflected by decentring of the average position Pm of the aberration zones ZX, that is, a shift in this average position Pm from the centre of the graphic code CG1 (in case of uniform light exposure, cf. FIG. 8A) to a decentred position located in the aberration region RX (in case of uniform light exposure, cf. FIG. 8B). The variance in position Vm of the aberration zones ZX detected during the reading is also significantly reduced in the case of uniform light exposure.

It is assumed now that the reading device DV1 performs steps S2 and S4 such as described previously in reference to FIGS. 4-5. Also, as illustrated in FIG. 6, the processing unit DV3 performs the steps S30, S32, S34 and S36 to adapt the spatial interpolation according to the lighting conditions to which the graphic code CG1 is subjected. These lighting conditions constitute a parameter of the current acquisition conditions CD1.

More precisely, during the detection step S30 the processing unit DV3 detects aberration zones ZX in the calibration zones ZC based on the observable colours CLB measured during the measuring step S4. Various techniques can be employed to detect aberration zones ZX. In the example described here, the processing unit DV3 determines the average intensity of colour Lm of the entire graphic code CG1 based on the image data DT1 and determines that a calibration zone ZC constitutes an aberration zone ZX if its colour intensity is substantially less than the average colour intensity Lm. In this example, the processing unit DV3 determines that a calibration zone ZC constitutes an aberration zone ZX if this calibration zone ZC exhibits a colour intensity which satisfies a predefined condition CD2. This condition CD2 is fulfilled for example if the colour intensity L measured for a calibration zone ZC during the measuring step S4 is less than or equal to X % of the average colour intensity Lm, where X is a positive integer such that X≤75 (X is for example equal to 75, 60 or 50). By way of variant, the condition CD2 is fulfilled if the light intensity of the zone in question is located outside an interval [light intensity average−k*Deviation type; light intensity average+k*deviation type], where k is a real number>0.

Once the aberration zones ZX have been detected (S30), the processing unit DV3 performs a calculation step S32 during which it calculates the average position Pm of the aberration zones ZX detected in the graphic code CG1 and calculates the variance in position Vm of these aberration zones ZX.

During a location step S34, the processing unit DV3 determines whether an aberration region RX is present at the surface of the graphic code CG1. For this to occur, the processing unit DV3 compares the average position Pm obtained at S32 to a central reference position PC representative of the average theoretical position of the aberration zones ZX in case of uniform lighting (this position PC corresponds for example to the geometric centre of the graphic code in question). In the event of uniform lighting, the average position Pm is supposed to coincide with, or at the very least be close to, the central reference position PC. On the contrary, the average position Pm is supposed to be relatively far away from this central reference position PC. According to a particular example, if the distance separating the average position Pm and the central reference position PC exceeds a predefined threshold, the processing unit DV3 determines (S34) that an aberration region RX does exist.

The processing unit DV3 can analyze, apart from the average position Pm, the average variance Vm to detect the presence of an aberration region RX. When an aberration region RX occurs, the variance in position Vm is generally less than a predefined threshold which can be defined as a percentage of an average reference variance.

It is assumed in this example that the processing unit DV3 detects (S34) an aberration region RX which here is located in the lower right corner of the graphic code CG1 (FIGS. 7B and 8B). The processing unit DV3 further locates (S34) this aberration region RX based on the previously calculated average position Pm and the variance in position Vm.

In the case being considered here where an aberration region RX is detected and located, the processing unit DV3 adapts (S36, FIG. 6) the spatial interpolation S10 such as previously described in reference to FIGS. 4-5. More particularly, the spatial interpolation S10 is adapted in that for each position of a data zone ZC the processing unit DV3 verifies whether it is in the aberration region RX or not. In the affirmative, the spatial interpolation is performed in said data zone ZD so as to attribute (S20) greater weights W to the observable colours CLB measured in the calibration zones ZC located in the aberration region RX than to the observable colours CLB measured in the calibration zones ZC located outside the aberration region RX.

It is therefore possible to improve the results of spatial interpolation even more, and therefore of the reading of the 2D graphic code in its entirety, by adapting the spatial interpolation if an aberration region RX is detected in the 2D graphic code. During the spatial interpolation S10, more importance is given to the observable colours CLB of the calibration zones ZC located in the aberration region RX (than those positioned outside) to estimate the theoretically observable colour CLC for each of the base colours of the colour base BS1 in the data zones ZC located in the aberration region RX.

As already indicated, in general the invention reliably and precisely reads high-density 2D graphic codes, in particular graphic codes comprising information coded in a base of at least 2, or even at least 3, distinct colours (or grey levels). But there is a problem in the difficulty of differentiating different base colours, especially when the number of base colours is considerable, for example in a base of 64 or 128 colours, or even more (the deviation between the base colours consequently being less). One way of limiting reading errors during the reading process of the invention is to reserve a relatively large part of the surface of the 2D graphic code for calibration zones ZC.

Further, the invention proposes using verification zones ZF (also called error correction zones) to verify the validity of the data zones ZD during reading of the 2D graphic code. based on these verification zones errors in the data zones ZC which are read can be detected and corrected if necessary, as described in more detail hereinbelow. The larger the part of the 2D graphic code restricted to these verification zones ZF, the more effectively the errors can be corrected during reading of the 2D graphic code, further improving the reading quality during implementation of the invention.

However, an added problem arises in that the greater the portion of the 2D graphic code restricted to the calibration zones ZC and to the verification zones ZF, the less space there remains in the 2D graphic code for storing information there in data zones ZD. Adding verification zones ZF in particular can drastically reduce the quantity of useful information encodable in the 2D graphic code.

Figure 10:
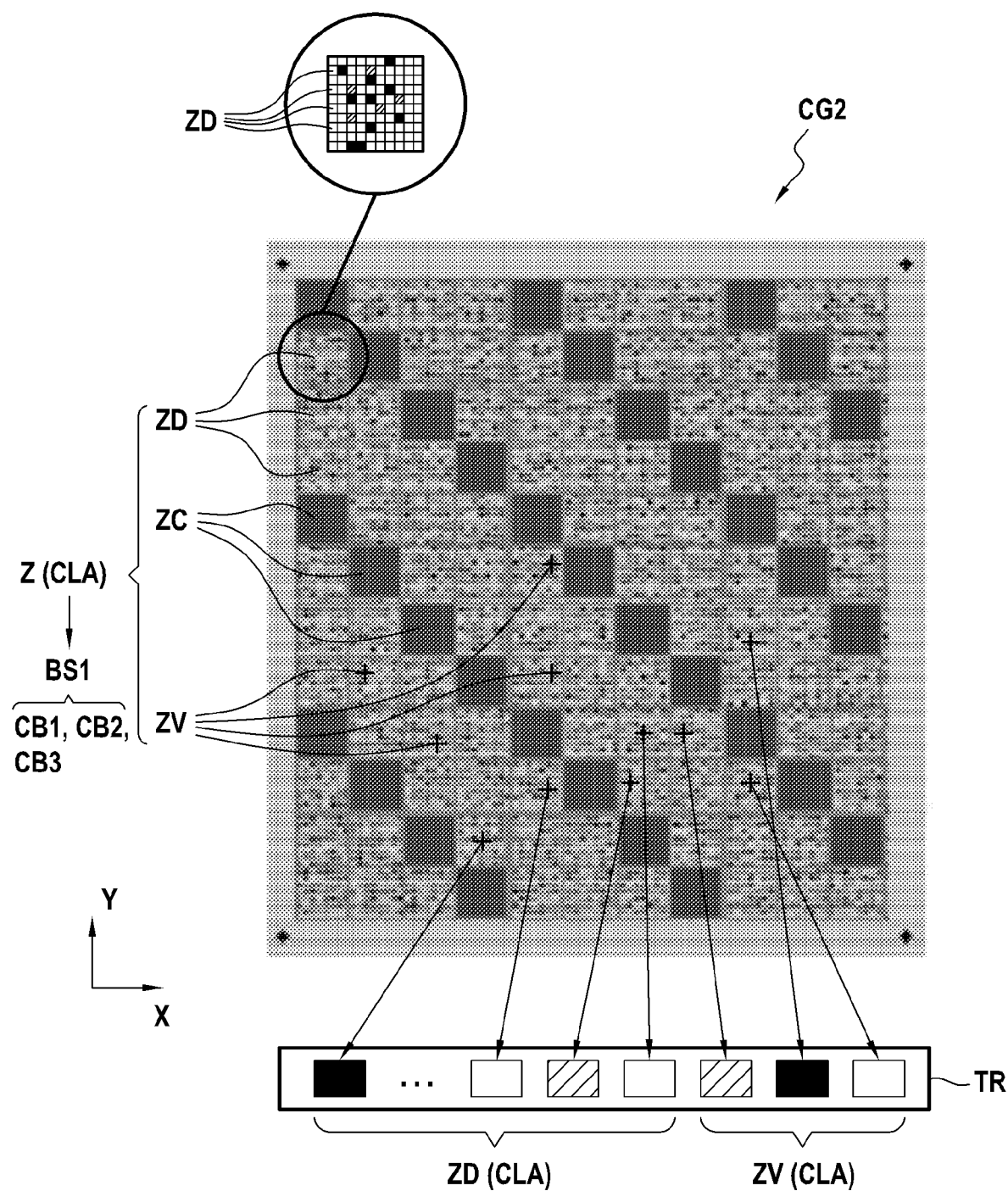
FIG. 10 schematically illustrates a 2D graphic code according to a particular embodiment of the invention.

To rectify these problems, the invention proposes a particular embodiment shown in FIG. 10 in which the graphic code CG1 described previously is adapted to integrate therein, in addition to the data zones ZD and the calibration zones ZC, at least one verification zone ZV (also called error correction zone) so as to form a new graphic code noted CG2. Unless specified otherwise, the preceding description of the graphic code CG1 applies similarly to the graphic code CG2 which differs solely by inclusion of verification zones ZV.

Even though the presence of a single verification zone VF can optionally suffice in some particular cases, the example illustrated in FIG. 10 is considered in which the graphic code CG2 comprises a plurality of verification zones ZF.

These verification zones ZV, similarly for the other zones Z included in the graphic code CG2, each exhibit a real colour CLA which is attributed to it in the database BS1 of N distinct base colours CB1-CB3 (where N=3 in this example).

The size, number and distribution of these verification zones ZV can be adapted according to case. In particular, as will appear later, the proportion of the graphic code CG2 restricted to the verification zones ZF can be limited in the present case due to a particular aspect of the invention described hereinbelow.

Also, as illustrated in FIG. 10, the data zones ZD are combined into frames TR of at least two data zones ZD each.

At least one verification zone ZV is associated with or allocated to each frame TR of the graphic code CG2. In other words, each frame TR comprises a plurality of data zones ZD and at least one verification zone ZV. In the example in question here, each data zone ZD and each verification zone ZV is allocated to a single frame TR.

It is assumed hereinbelow that each frame TR defined in the graphic code CG2 comprises a plurality of verification zones ZF, even though other examples are possible. It is also assumed in this example that the frames TR are defined so that it does not include a calibration zone ZC.

As already indicated, the verification zones ZF are intended to have the reading device DV1 verify the validity of the data zones ZD during reading of the graphic code CG2. For this purpose, in each frame TR of the graphic code CG2, the real colour CLA attributed to each verification zone ZF in said frame TR is a function of the real colours TR attributed to the data zones ZD of said frame TR. By executing a processing algorithm, based on the real colours CLA determined in the data zones ZD and in the verification zones ZV of a frame TR, it is possible to detect whether at least one error occurred during the reading (in data zones ZD and/or in verification zones VF) and, in the affirmative, to correct the error in one or more of these erroneous zones.

It should be noted that during the reading of the graphic code CG2 reading errors can occur in the data zones ZD but also in the verification zones ZV. Within the frame to which it belongs, these verification zones ZV therefore detect the errors likely to occur in the data zones ZD and in the verification zones ZV of said frame TR.

The verification zones ZF are distributed in the graphic code CG2 without necessarily being near the data zones ZD of the frame TR to which they belong. In the same way, the different data zones ZD of the same frame TR are not necessarily near each other. It is possible in particular to define frames TR such that the verification zones VF of the same frame TR are relatively far away from each other so as to make error correction less sensitive to the lighting conditions, improving the quality of the reading.

Figure 11:
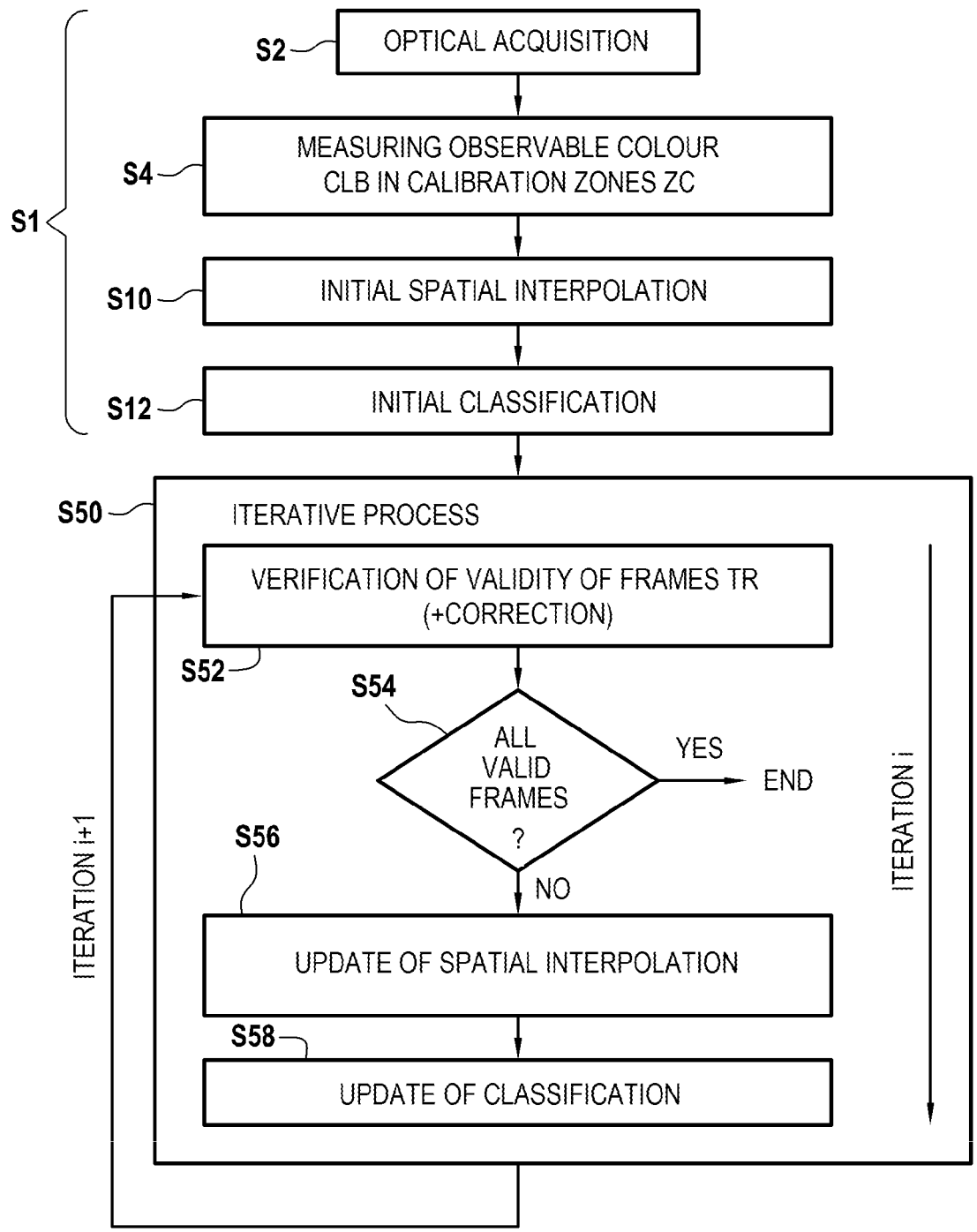
FIG. 11 is a diagram schematically illustrating the steps performed by a reading device for carrying out a reading method according to a particular embodiment of the invention, for example in light of reading a 2D graphic code such as illustrated in FIG. 10.
Figure 12:
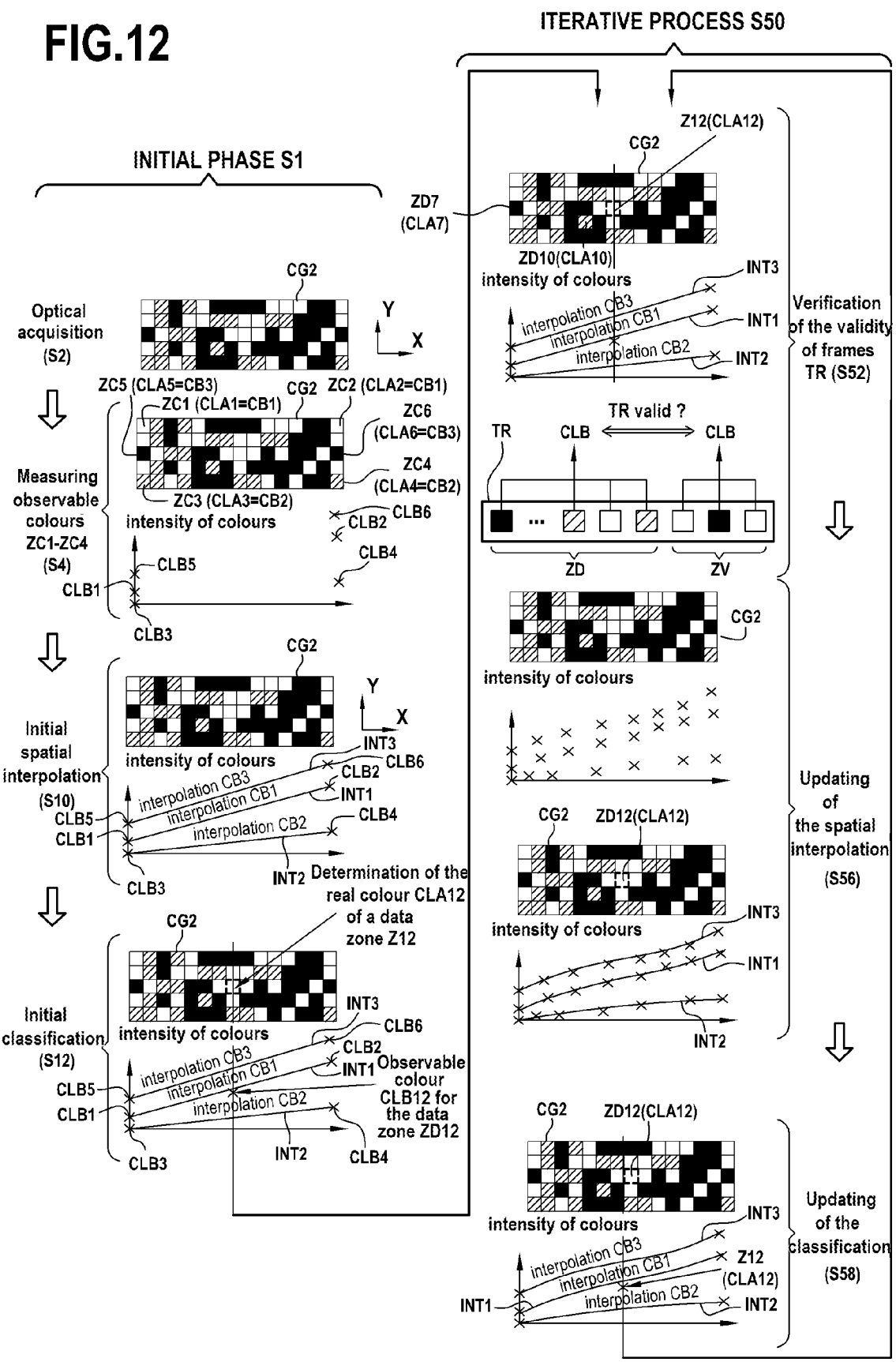
FIG. 12 schematically illustrates the steps of the reading method shown in FIG. 11, according to a particular embodiment of the invention.

A reading process, carried out by the reading device DV1 shown in FIGS. 2-3, is now described in reference to FIGS. 11-12. The processing unit DV3 in particular executes the instructions of the computer programme PG1 to perform reading of the graphic code CG2 illustrated in FIG. 10. FIG. 12 illustrates the implementation of the process of FIG. 11 according to a particular example.

In this particular mode, during an initial phase S1 the reading device DV1 performs steps S4, S6, S10 and S12 such as previously described in reference to FIGS. 4-5, then performs these steps again in an adapted manner in an iterative process S50 so as to read the graphic code CG2. Unless specified otherwise, it should be noted that the description made previously of each of these steps S4, S6, S10 and S12 applies similarly in this embodiment.

More precisely, the reading device DV1 performs an optical acquisition step S2 (FIGS. 11-12) of the graphic code CG2 illustrated in FIG. 10.

The processing unit DV3 then performs a measuring step S4 of the observable colour CLB in the calibration zones ZC of the graphic code CG2, as already described previously in reference to FIGS. 4-5. It is assumed in this particular example that the processing unit DV3 measures, based on the image data DT1, the observable colour CLB in all the zones Z of the graphic code CG2, that is, in the calibration zones ZC, in the data zones ZD and in the verification zones ZF. During the measuring step S4, based on position data DP1 previously recorded the processing unit DV3 can therefore especially detect the calibration zones ZC in the graphic code CG2 and then measure the observable colour CLB in these calibration zones ZB, similarly to what is described earlier in reference to FIGS. 4-5.

During a spatial interpolation step S10, the processing unit DV3 then performs spatial interpolation as already described previously, based on the observable colours CLB measured in the calibration zones ZC and the predefined positions of the calibration zones ZC, to produce an estimation of the theoretically observable colour CLC in the current acquisition conditions CD1 for each colour (CB1-CB3) of the colour base BS1 on the surface of the graphic code CG2. This step constitutes initial spatial interpolation in the sense where it is performed during the initial phase S1 prior to the iterative process S50.

In other words, the spatial interpolation step S10 such as previously described in reference to FIGS. 4-5 is applied this time to the data zones ZD and to the verification zones ZV so as to produce an estimation of the theoretically observable colour CLC in the current acquisition conditions CD1 for each base colour of the colour base BS1 in the positions of the data zones ZD and of the verification zones ZV.

During this spatial interpolation step S10, the processing unit DV3 can perform spatial interpolation to estimate respectively the theoretically observable colour CLC in the current acquisition conditions CD1 for each base colour CB1-CB3 of the colour base BS1 in the positions of each data zone ZC and of each verification zone ZV. This spatial interpolation estimates the theoretical visual rendition of each base colour CB1-CB3 as a function of the position in the graphic code CG1. An estimation of the theoretically observable colour CLC in the current acquisition conditions CD1 for each colour of the colour base BS1 is produced in the positions of each data zone ZC and of each verification zone ZV of the graphic code CG2.

The processing unit DV3 then performs a classification step S12 (FIGS. 11-12) as already described previously to determine, based on the result of the spatial interpolation initial S10, the real colour CLA (otherwise called the class) attributed to the data zones ZD and to the verification zones ZF analyzed in the graphic code CG2. This step S12 constitutes initial classification here in the sense where it is performed during the initial phase S1 prior to the iterative process S50. It is assumed in this example that, during the initial classification S12, each data zone ZD and each verification zone ZF of the graphic code CG2 is analyzed to determine its real colour CLA attributed in the colour base BS1, even though other examples are possible.

In other words, the classification step S12 such as previously described in reference to FIGS. 4-5 is applied to the data zones ZD and to the verification zones ZV so as to determine, based on the spatial interpolation initial S10, the real colour CLA attributed to the data zones ZD and to the verification zones ZV of the graphic code CG2.

As illustrated in FIG. 12, a data zone ZD or a verification zone ZV of which the processing unit DV3 tries to determine the real corresponding colour CLB12 during the initial classification step S12 is called Z12, for example. The processing unit DV3 determines for example that the base colour CB1 is the real colour CLA12 attributed to the analyzed zone Z12, since the observable colour CLB12 of the analyzed zone Z12 is closer to the theoretically observable value CLC interpolated for the base colour CB1 (as defined by INT1) than theoretically observable values CLC interpolated respectively for the base colours CB2 and CB3 (as defined respectively by INT2 and INT3).

The processing unit DV3 then performs the iterative process S50 (FIGS. 11-12) which comprises at least one iteration during which the process performs steps S52 to S58 as described hereinbelow. Steps S52-S58 will now be described during a first iteration constituting a current iteration i of the iterative process. It is understood that this description applies by analogy to each iteration performed by the processing unit DV3 during the iterative process S50.

During step S52, for each frame TR of the graphic code CG2 the processing unit DV3 verifies the validity of the real colours CLA determined during the preceding classification for the data zones ZD of said frame TR, based on the real colour CLA determined during said preceding classification for the verification zones ZV of said frame TR. In general, "preceding classification" means the most recent classification S12 executed at this stage by the processing unit DV3 during the iterative process S50 (during the preceding iteration) or, failing that (if it is the first iteration of the iterative process), the initial classification S12 executed during the initial phase S1. In the case in question here, the preceding classification which is taken into account at the verification step S52 is therefore the initial classification S12 performed during the initial phase S1.

Verification S52 of the validity is performed by the processing unit DV3 by executing a predefined verification algorithm (such as the Reed-Solomon code or any other suitable corrective code) which can be adapted according to case. The processing unit DV3 can perform an integrity calculation based on the real colours CLA determined during the preceding classification S12 for the data zones ZD of a given frame TR and verify whether the result of this calculation is in accordance with the real colours CLA determined during the preceding classification S12 for the verification zones ZV of this frame TR. As already indicated, the graphic code CG2 is configured such that for each frame TR of the graphic code CG2 the real colour CLA attributed to each verification zone ZF in said frame TR is a function of the real colours CLA attributed to the data zones ZD of said frame TR. Executing the integrity calculation as per a suitable verification algorithm makes it possible to verify the correspondence between the colours of the data zones ZD and those of the verification zones ZV in the same frame TR.

Based on this integrity calculation performed at S52 for each frame TR, the processing unit DV3 can detect (S52) if at least one error has occurred during the reading, that is, if a colour determined as a real colour CLA in at least one data zone ZD and/or in at least one verification zone ZV of said frame is erroneous.

According to a particular example, during the verification step S52 the validity of each frame TR is verified by performing an integrity calculation on the real colours CLA determined during the preceding classification (specifically, the initial classification S12 in this example) for the data zones ZD of the frame TR and by comparing the result of this integrity calculation to the real colour CLA determined during said preceding classification for the verification zones ZV of the frame TR in question.

If at least one error is detected during the verification step S52, the processing unit DV3 can optionally also correct an error in one or more zones (data zones ZD and/or verification zones ZV) of the frame TR based on the results of the calculation made. But it is generally not possible to correct the real colours CLA of a frame TR if an excessive number of errors has occurred during the preceding classification. In general, it can be considered for example that a verification algorithm corrects as many as k/2 errors in a frame comprising k verification zones ZV (k being an integer such that k≥2).

The processing unit DV3 then determines (S54) whether all the frames TR verified during the preceding verification step S52 are valid. A frame TR is considered as being invalid if at least one error has been detected in a zone of the frame TR (given that this error could not be corrected in the particular case where a correction mechanism is carried out during the verification step S52). If at least one invalid frame TR is detected (S54), the iterative process S50 continues to the updating step S56. On the contrary, the iterative process S50 finishes to the extent where the real colours CLA determined during the preceding classification are considered as being correct, the process able to optionally continue by performing the determination step S18 as already described previously in reference to FIG. 4.

During the updating step S56 the processing unit DV3 updates the spatial interpolation by using, as calibration zone ZC, all or some of the zones of the frames TR detected as valid, that is, the frames TR the real colours of which CLA of the data zones ZD have been determined as being valid during the verification S50 of the current iteration i. This update S56 is therefore completed here relative to the preceding spatial interpolation, that is, the most recent spatial interpolation S56 performed by the processing unit DV3 at this stage during the iterative process S50 (during the preceding iteration) or, failing that (if it is the first iteration of the iterative process S50), the initial spatial interpolation S10 performed during the initial phase S1. In the case considered here (first iteration) the preceding spatial interpolation which is therefore updated during the updating step S56 is the initial spatial interpolation S10 performed during the initial phase S1.

During this update S56, the processing unit DV3 again performs (reiterates) the spatial interpolation S10 (described hereinabove in reference to FIGS. 4-5) during each current iteration i of the iterative process S50 by using, as calibration zone ZC, all or some of the zones Z (the data zones ZD and/or the verification zones ZV) of the frames TR determined as being valid during the verification S52 of the current iteration i, so as to update the estimation of the theoretically observable colour CLC in the current acquisition conditions CD1 for each base colour (CB1-CB3) of the colour base BS1 on the surface of the 2D graphic code. In particular, updating of this estimation by interpolation can be performed in the position of each data zone ZD and/or of each verification zone ZV of the graphic code CG2.

During this update S56, via spatial interpolation the processing unit DV3 therefore re-evaluates the theoretically observable colours CLC in the current acquisition conditions CD1 for each base colour (CB1-CB3) in the entire surface of the graphic code CG2 but by taking into account not only the known reference colours in the calibration zones ZC but also the determined (and presumed correct) real colours CLA in the zones Z of the frames TR detected as being valid.

This update S56 progressively improves the quality of the spatial interpolation throughout the iterations of the iterative process S50 by using valid zones of frames TR as calibration zone ZC.

According to a particular example, during updating S56 of the spatial interpolation at least the data zones ZD of each frame TR detected as being valid during the verification S50 of the current iteration i are taken into account as calibration zones ZC during updating S56 of the spatial interpolation. It is possible for example to use only the data zones ZD or, alternatively, only the verification zones ZV of the valid frames to update the spatial interpolation.

According to a preferred embodiment, during updating S56 of the spatial interpolation each data zone ZD and each associated verification zone ZV of each frame TR determined as being valid during the verification S50 of the current iteration i are taken into account as calibration zones ZC during updating S56 of the spatial interpolation. It is therefore possible to maximize the number of zones of the graphic code CG2 which are used as calibration zones ZC during updating S56 of the spatial interpolation, and accordingly to improve the quality of the spatial interpolation.

According to a particular example, during updating S56 of the spatial interpolation, the zones Z of each frame TR detected as being invalid, that is, the real colours CLA of which have been determined as being invalid during the preceding classification, are excluded from the zones taken into account as calibration zones ZC. The data zones ZD and the verification zones ZV of the invalid frames are considered as being erroneous and are therefore not used as calibration zones ZC so as not to degrade the quality of the spatial interpolation as it is being updated.

During the updating step S58, the processing unit DV3 then updates the classification to determine, based on the result of the updated spatial interpolation at S56 (during the current iteration i), the real colour CLA (otherwise called the class) attributed to the data zones ZD and to the verification zones ZV of the graphic code CG2. This updating is therefore done here relative to the preceding classification, that is, the most recent classification S58 performed by the processing unit DV3 at this stage during the iterative process S50 (during the preceding iteration) or, failing that (if this is the first iteration of the iterative process S50), the initial classification S12 performed during the initial phase S1. In the case being considered here (first iteration), the preceding classification which is therefore updated during the updating step S58 is the initial classification S12 performed during the initial phase S1.

During this updating S58, the processing unit DV3 again performs (reiterates) the classification S12 (described hereinabove in reference to FIGS. 4-5) during each current iteration i of the iterative process S50 for determining the real colours CLA attributed to the data zones ZD and to the verification zones ZV, this time by using the result of the spatial interpolation freshly updated at S56 during the current iteration i of the iterative process S50.

In particular, during the classification S12, for each analyzed data zone ZD and for each analyzed verification zone ZV the processing unit DV3 can perform a comparison step S14 and a determination step S16, as already described previously in reference to FIGS. 4-5.

As illustrated in FIG. 12, in this example the processing unit DV3 can then determine (S14), based on the spatial interpolations INT1, INT2 and INT3 updated at S56 during the current iteration i, an estimation of the theoretically observable colours CLC for each of the base colours CB1, CB2 and CB3 at the position of an analyzed zone Z12 which can be a data zone ZC or a verification zone ZD. The processing unit DV3 can then compare (S14) the observable colour measured in said analyzed zone Z12 to the interpolated values CLC1, CLC2 and CLC3 obtained respectively for each of the base colours CB1, CB2 and CB3 at the position of the analyzed zone Z12. The processing unit DV3 can determine (S16) the base colour (specifically CB1 in this example) for which the theoretically observable colour CLC obtained by interpolation is the closest to the observable colour CLB effectively measured for the zone Z12 in question. The processing unit DV3 deduces from this that the analyzed zone Z12 exhibits the base colour (CB1 in this example) as a real colour CLA to which the theoretically observable colour CLC is the closest.

This updating S58 therefore progressively improves the quality of the classification throughout the iterations of the iterative process S50 each time by using the results of the spatial interpolations updated during the current iteration i of the iterative process S50.

Once the updating step S58 is completed, a new iteration i+1 of the iterative process S50 can be performed by the processing unit DV3 (FIGS. 11-12). During this new iteration, the processing unit DV3 performs the steps S52-S58 as already described hereinabove.

According to the example in question here, during the iterative process S50 (FIGS. 11-12), the processing unit DV3 verifies the validity of all the frames TR during the verification step S52 prior to starting the updating S56 of the spatial interpolation. Even though other implementations are possible, this effectively performs the iterative process S50 to the extent where execution of the updating S56 of the spatial interpolation generally requires more processing resources and time than the verification S52 of the frames TR. In this way, execution of the reading process can be improved even more. By way of variant, it is possible however to start updating S56 of the spatial interpolation prior to completion of the verification S52 so as to consider the zones Z of each frame TR already detected as calibration zones ZC as valid during execution of the verification S52.

According to a particular example, a plurality of iterations of the iterative process S50 is performed. The iterative process S50 can then be repeated until all the frames TR of the graphic code CG2 are determined as being valid during the verification S52 of a current iteration i. The reading device DV1 concludes that the real colours CLA of the data zones ZD and of the verification zones ZV of the graphic code CG2 are those determined during updating S58 of the classification during the most recent iteration of the iterative process S50.

In other words, the iterative process S50 continues until it converges with classification results obtained while no further error is detected in the frames TR during the verification step S52. By way of variant, the iterative process S50 ends when the number of errors detected in the frames TR during the verification S52 is less than a predefined value threshold.

The embodiments described hereinabove in reference to FIG. 11 further improve the quality and efficacy of the reading process of the invention to the extent where the zones of the frames TR determined as being valid can be used as calibration zone ZC in addition to the calibration zones ZC present by definition in the 2D graphic code. The use of new zones Z of the graphic code as calibration zones ZC improves spatial interpolation performed at each iteration of the iterative process and therefore reduces errors likely to occur during subsequent classification.

The invention thus makes it possible to perform reliable and precise reading of a high-density 2D graphic code, irrespective of the acquisition conditions, with increased processing efficacy and further improved results.

Also, it is possible to limit the portion of the 2D graphic code restricted by configuration to the calibration zones ZC and maintain good reading performance. In fact, the calibration zones ZC predefined originally in the 2D graphic code initiate execution of the iterative process S50 (FIG. 11). Once this iterative process is underway, data zones ZD and verification zones ZV of valid frames can be processed as calibration zones ZC during spatial interpolation to progressively refine results.

Because of the invention, the space restricted to the calibration zones ZC in a 2D graphic code can therefore be limited and the quantity of information which can be stored in the data zones ZD can accordingly be increased, also ensuring good reading performance.

According to a particular example, the verification zones ZV included in the graphic code CG2 (prior to execution of said iterative process S50) illustrate at a maximum 10% of the total surface of the graphic code CG2.

A skilled person will understand that the embodiments and variants described hereinabove constitute only non-limiting examples of the embodiment of the invention. In particular, the skilled person could envisage any adaptation or combination of the embodiments and variants described hereinabove to respond to a very special need.

The invention claimed is:

1. A method carried out by a reading device for reading a 2D graphic code comprising a plurality of zones each presenting a real colour which is attributed to the zone in a base of N distinct colours, N being an integer such that N≥2, wherein said zones comprise:
   data zones encoding information based on the real colours of said data zones; and
   at least 2N calibration zones at predefined positions in the 2D graphic code, the real colour of each calibration zone being a predefined reference colour in said colour base, the 2D graphic code comprising at least 2 calibration zones for each colour of the colour base,
the method comprising:
   optically acquiring the 2D graphic code in current acquisition conditions to obtain image data;
   measuring, based on the image data, the observable colour in the calibration zones in the current acquisition conditions;
   performing a spatial interpolation, based on the observable colours measured in the calibration zones and predefined positions of said calibration zones, to produce an estimation of the theoretically observable colour in the current acquisition conditions for each colour of the colour base in the data zones as a function of the position of said data zones; and
   performing a classification based on the result of the spatial interpolation for determining the real colour attributed to at least one analysed data zone, wherein said classification comprises for each analysed data zone:
      comparing the observable colour measured in said analysed data zone with the theoretically observable colour estimated for each colour of the colour base at the position of said analysed data zone; and
      determining, as real colour of said analysed data zone, the colour of the colour base of which the theoretically observable colour estimated at the position of said analysed data zone is the closest to the observable colour measured in said analysed data zone,
   wherein the data zones are combined into frames of at least two data zones, the zones of the 2D graphic code further comprising verification zones, at least one verification zone being associated with each of said frames;
   wherein the spatial interpolation is applied to the data zones and to the verification zones so as to produce an estimation of the theoretically observable colour in the current acquisition conditions for each colour of the colour base in the positions of the data zones and of the verification zones;
   wherein the classification is applied to the data zones and to the verification zones so as to determine, based on the spatial interpolation, the real colour attributed to the data zones and to the verification zones of the 2D graphic code, the method comprising an iterative process including during at least one current iteration:
      verifying, for each frame of the 2D graphic code, the validity of the real colours determined during the preceding classification for the data zones of said frame, based on the real colour determined during said preceding classification for said at least one verification zone of said frame;
      updating of the spatial interpolation by using, as calibration zone, all or some of the zones of the frames of which the colours of the data zones have been determined as being valid during said verification of the current iteration; and
      updating of the classification to determine, based on the result of the updated spatial interpolation, the real colour attributed to the data zones and to the verification zones of the 2D graphic code.

2. The method according to claim 1, further comprising:
   determining information encoded in the 2D graphic code based on the real colour determined during said classification as being attributed to each analysed data zone.

3. The method according to claim 1, further comprising detecting the calibration zones in the 2D graphic code based on the image data and based on previously recorded position data which comprise the predefined positions of each calibration zone in the 2D graphic code.

4. The method according to claim 1, wherein during the spatial interpolation an estimation of the theoretically observable colour in the current acquisition conditions for each colour of the colour base is produced in the position of each data zone of the 2D graphic code.

5. The method according to claim 1, wherein the spatial interpolation is performed so as to attribute, for at least one data zone, different weights to the observable colours measured in the calibration zones as a function of the distance separating said calibration zones from said data zone.

6. The method according to claim 5, wherein during the spatial interpolation the estimation of the theoretically observable colour (CLC) for each colour of the colour base is adapted in each data zone (ZD) such that a greater weight (W) is attributed to an observable colour measured in a first calibration zone presenting a reference colour in the colour base relative to an observable colour measured in at least one other second calibration zone presenting said reference colour if said first calibration zone is closer to said data zone than said at least one second calibration zone.

7. The method according to claim 1, wherein said comparing comprises:
   determining a deviation in respective colour between the observable colour measured in said analysed data zone and the theoretically observable colour estimated for each colour of the colour base at the position of said analysed data zone,
wherein said real colour determined as colour attributed to said analysed data zone is the colour of the colour base for which said deviation is the lowest.

8. The method according to claim 1, wherein the calibration zones are distributed uniformly over the entire surface of the 2D graphic code.

9. The method according to claim 1, wherein the calibration zones are distributed randomly over the surface of the 2D graphic code.

10. The method according to claim 1, further comprising:
detecting aberration zones in the 2D graphic code;
calculating the average position and of the variance in position of the aberration zones in the 2D graphic code; and
locating an aberration region in the 2D graphic code based on the average position and of the variance in position;
wherein the spatial interpolation comprises:
verifying, for each data zone, if it is in the aberration region; and
if the data zone is in the aberration zone, performing the spatial interpolation in said data zone so as to attribute greater weights to the observable colours measured in the calibration zones located in the aberration region than to the observable colours measured in the calibration zones located outside the aberration region.

11. The method according to claim 1, wherein during the verification the validity of each frame is verified by performing an integrity calculation on the real colours determined during said preceding classification for the data zones of the frame and by comparing the result of said integrity calculation to the real colour determined during said preceding classification for said at least one verification zone of said frame.

12. The method according to claim 11, wherein each data zone as well as said at least one associated verification zone of each frame of which the colours of the data zones have been determined as being valid during said verification are taken into account as calibration zones during the updating of the spatial interpolation.

13. The method according to claim 11, wherein, during the updating of the spatial interpolation, the zones of each frame, the real colours of which have been determined as being invalid during the preceding classification, are excluded from the zones taken into account as calibration zones.

14. The method according to claim 1, wherein during updating of the classification the real colour determined as being attributed to at least one data zone is corrected based on said at least one verification zone associated with the frame of said data zone.

15. The method according to claim 1, wherein during a current iteration of the iterative process the validity of the colours determined during the preceding classification for the data zones of each frame of the 2D graphic code is verified, prior to updating the spatial interpolation based on the result of the updated spatial interpolation.

16. The method according claim 1, wherein the method comprises a plurality of iterations of the iterative process, said iterative process being repeated until all the frames of the 2D graphic code are determined as being valid during said verification of a current iteration, the real colours of each data zone and each verification zone being those determined during the updating of the classification of the last iteration.

17. A non-transitory computer program product comprising instructions that, when executed by a processor, cause the processor to execute a method according to claim 1.

18. A device for reading a 2D graphic code comprising a plurality of zones each presenting a real colour which is attributed to the zone in a base of N distinct colours, N being an integer such that N≥2,
said zones comprising:
data zones encoding information based on the real colours of said data zones; and
at least 2N calibration zones at predefined positions in the 2D graphic code, the real colour of each calibration zone being a predefined reference colour in said colour base, the 2D graphic code comprising at least 2 calibration zones for each colour of the colour base,
the device comprising:
a processor; and
a memory storing instructions that, when executed by the processor, cause the process to:
optically acquire the 2D graphic code in current acquisition conditions to obtain image data;
measure, based on the image data, the observable colour in the calibration zones in the current acquisition conditions;
perform a spatial interpolation based on the observable colours measured in the calibration zones and the predefined positions of said calibration zones so as to produce an estimation of the theoretically observable colour in the current acquisition conditions for each colour of the colour base in the data zones as a function of the position of said data zones; and
determine based on the result of the spatial interpolation the real colour attributed to at least one analysed data zone, including for each analysed data zone:
compare the observable colour measured in said analysed data zone with the theoretically observable colour estimated for each colour of the colour base at the position of said analysed data zone; and
determine, as real colour of said analysed data zone, the colour of the colour base of which the theoretically observable colour estimated at the position of said analysed data zone is the closest to the observable colour measured in said analysed data zone,
wherein the data zones are combined into frames of at least two data zones, the zones of the 2D graphic code further comprising verification zones, at least one verification zone being associated with each of said frames;
wherein the spatial interpolation is applied to the data zones and to the verification zones so as to produce an estimation of the theoretically observable colour in the current acquisition conditions for each colour of the colour base in the positions of the data zones and of the verification zones;
wherein the classification is applied to the data zones and to the verification zones so as to determine, based on the spatial interpolation, the real colour attributed to the data zones and to the verification zones of the 2D graphic code, the method comprising an iterative process including during at least one current iteration:
verifying, for each frame of the 2D graphic code, the validity of the real colours determined during the preceding classification for the data zones of said frame, based on the real colour determined during said preceding classification for said at least one verification zone of said frame;
updating of the spatial interpolation by using, as calibration zone, all or some of the zones of the frames of which the colours of the data zones have been determined as being valid during said verification of the current iteration; and
updating of the classification to determine, based on the result of the updated spatial interpolation, the real colour attributed to the data zones and to the verification zones of the 2D graphic code.

\* \* \* \* \*